(12) United States Patent
Yuan et al.

(10) Patent No.: US 12,537,636 B2
(45) Date of Patent: Jan. 27, 2026

(54) METHOD AND APPARATUS FOR PROCESSING CHANNEL STATE INFORMATION, AND TERMINAL

(71) Applicant: VIVO MOBILE COMMUNICATION CO., LTD., Guangdong (CN)

(72) Inventors: Jiangwei Yuan, Guangdong (CN); Yang Song, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 356 days.

(21) Appl. No.: 18/299,309

(22) Filed: Apr. 12, 2023

(65) Prior Publication Data
US 2023/0246759 A1    Aug. 3, 2023

Related U.S. Application Data

(63) Continuation of application No. PCT/CN2021/124831, filed on Oct. 20, 2021.

(30) Foreign Application Priority Data

Oct. 20, 2020    (CN) .......................... 202011126243.1

(51) Int. Cl.
*H04L 5/00* (2006.01)
(52) U.S. Cl.
CPC .......... *H04L 5/0035* (2013.01); *H04L 5/0053* (2013.01)
(58) Field of Classification Search
CPC ... H04L 5/0035; H04L 5/0053; H04L 5/0057; H04L 1/0026; H04L 1/0072; H04L 1/1671; H04L 1/1819; H04L 1/08; H04W 72/1268; H04W 72/21; H04W 72/232
See application file for complete search history.

(56) References Cited

U.S. PATENT DOCUMENTS

| 2013/0322376 | A1 | 12/2013 | Marinier et al. |
| 2020/0281011 | A1 | 9/2020 | Xiong et al. |
| 2021/0167830 | A1 | 6/2021 | Song et al. |
| 2021/0184819 | A1 | 6/2021 | Takeda et al. |
| 2021/0352699 | A1 | 11/2021 | Lin et al. |

(Continued)

FOREIGN PATENT DOCUMENTS

| CN | 110831196 A | 2/2020 |
| CN | 111385073 A | 7/2020 |

(Continued)

OTHER PUBLICATIONS

ZTE, "CSI enhancements for Multi-TRP and FR1 FDD reciprocity", 3GPP TSG RAN WG1 #102-e, R1-2005460, e-Meeting, Aug. 17-28, 2020.

(Continued)

*Primary Examiner* — Jamal Javaid
(74) *Attorney, Agent, or Firm* — Price Heneveld LLP

(57) ABSTRACT

This application relates to the field of communications technologies, and discloses a method and apparatus for processing channel state information, and a terminal. The method includes: transmitting, based on uplink channel, a multi transmission-reception point channel state information MTRP CSI report to multiple transmission-reception points TRPs, where the MTRP CSI report includes multiple CSI parameters.

20 Claims, 4 Drawing Sheets

(56) References Cited

U.S. PATENT DOCUMENTS

| 2022/0007356 A1 | 1/2022 | Lee et al. |
| 2022/0053359 A1 | 2/2022 | Song et al. |
| 2022/0078655 A1* | 3/2022 | Venugopal ............ H04W 72/21 |
| 2022/0104224 A1 | 3/2022 | Choi et al. |

FOREIGN PATENT DOCUMENTS

| CN | 111614389 A | 9/2020 |
| JP | 2015523013 A | 8/2015 |
| JP | 2020048062 A | 3/2020 |
| WO | 2019160741 A1 | 8/2019 |
| WO | 2020044409 A1 | 3/2020 |
| WO | 2020051922 A1 | 3/2020 |
| WO | 2020056708 A1 | 3/2020 |
| WO | 2020091050 A1 | 5/2020 |
| WO | 2020144602 A1 | 7/2020 |
| WO | 2020145769 A1 | 7/2020 |

OTHER PUBLICATIONS

Moderator (China Telecom), "[102 e NR CovEnh 03] Email discussion/approval on PUSCH coverage enhancement", 3GPP TSG RAN WG1 Meeting #102-e, R1-2007404, E-meeting, Aug. 17, 28, 2020.

Spreadtrum Communications, Discussion on Multi-TRP transmission, 3GPP TSG RAN WG1 #99, R1-1912562, Nov. 18-22, 2019, Reno, USA.

Spreadtrum Communications, Discussion on CSI enhancement for multiple TRP/Panel transmission, 3GPP TSG RAN WG1#102-e, R1-2006262, Aug. 17-28, 2020, e-Meeting.

Huawei, Hisilicon, "Enhancements on CSI for Rel-17", 3GPP TSG RAN WG1 Meeting #102-e, R1-2005248, Aug. 17-28, 2020, E-meeting.

VIVO, "Evaluation on MTRP CSI and Partial reciprocity", 3GPP TSG RAN WG1 #102-e, R1-2005369, Aug. 17-28, 2020, e-Meeting.

* cited by examiner

METHOD AND APPARATUS FOR PROCESSING CHANNEL STATE INFORMATION, AND TERMINAL

CROSS-REFERENCE TO RELATED APPLICATIONS

This application is a continuation application of PCT International Application No. PCT/CN2021/124831 filed on Oct. 20, 2021, which claims priority to Chinese Patent Application No. 202011126243.1, filed in China on Oct. 20, 2020. All of the disclosures are incorporated herein by reference in their entireties.

TECHNICAL FIELD

This application relates to the field of communications technologies, and specifically, to a method and an apparatus for processing channel state information, and a terminal.

BACKGROUND

In a current mobile communications technology, for multi transmission-reception point or multi antenna panel (multi-TRP/multi-panel) reporting setting, multiple channel state information (CSI) reporting settings are configured, where a resource setting of each reporting setting corresponds to one transmission-reception point (TRP), meaning each CSI reporting setting corresponds to one TRP. CSI reporting in this manner is subject to low efficiency.

SUMMARY

According to a first aspect, a method for processing channel state information is provided. The method is performed by a terminal and includes: transmitting, based on uplink channel, a multi transmission-reception point channel state information MTRP CSI report to multiple transmission-reception points TRPs, where the MTRP CSI report includes multiple CSIs.

According to a second aspect, an apparatus for processing channel state information is provided. The apparatus includes: a transmission module, configured to transmit, based on uplink channel, a multi transmission-reception point channel state information MTRP CSI report to multiple transmission-reception points TRPs, where the MTRP CSI report includes multiple CSIs.

According to a third aspect, a terminal is provided. The terminal includes a processor, a memory, and a program or instructions stored in the memory and capable of running on the processor. When the program or instructions are executed by the processor, the steps of the method according to the first aspect are implemented.

According to a fourth aspect, a network-side device is provided. The network-side device includes a processor, a memory, and a program or instructions stored in the memory and capable of running on the processor. When the program or instructions are executed by the processor, the steps of the method according to the first aspect are implemented.

According to a fifth aspect, a readable storage medium is provided. The readable storage medium stores a program or instructions. When the program or instructions are executed by a processor, the steps of the method according to the first aspect are implemented.

According to a sixth aspect, a chip is provided. The chip includes a processor and a communications interface. The communications interface is coupled to the processor. The processor is configured to run a program or instructions on a network-side device to implement the method according to the first aspect.

According to a seventh aspect, a computer program product is provided. The computer program product is stored in a non-transitory storage medium. The program product is executed by at least one processor to implement the method according to the first aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. In the following descriptions, a new radio (New Radio, NR) system is described for an illustrative purpose, and NR terms are used in most of the following descriptions. However, these technologies may also be applied to other applications than the NR system application, for example, a 6th Generation (6G) communications system.

Figure 1:
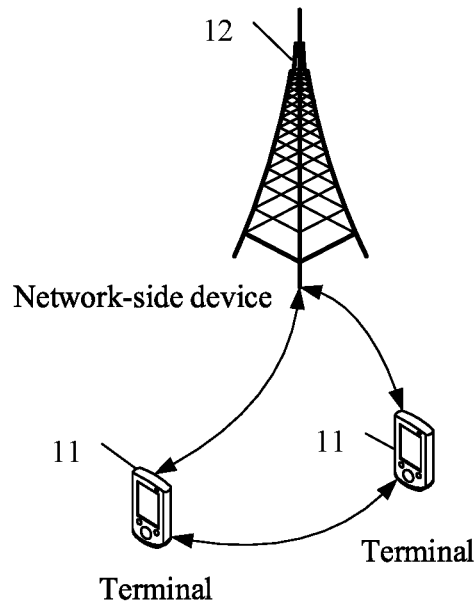
FIG. 1 is a block diagram of a wireless communications system to which an embodiment of this application may be applied.

FIG. 1 is a block diagram of a wireless communications system to which an embodiment of this application may be applied. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, a vehicular device (VUE), or a pedestrian terminal (PUE). The wearable device includes a wrist band, an earphone, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission-reception point (TRP), or other appropriate terms in the art, as long as the same technical effect is achieved. The base station is not limited to any specific technical terms. It should be noted that in the embodiments of this application, only the base station in the NR system is used as an example, but the base station is not limited to any specific type.

First, related terms in the embodiments of this application are explained.

I. Multi-TRP Transmission Technology

3GPP Rel-16 standardizes a multi transmission-reception point or multi antenna panel (multi-TRP/multi-panel) scenario to improve transmission reliability and throughput performance. For example, UE can receive same data or different data from multiple TRPs. An ideal backhaul and a non-ideal backhaul exist between the multiple TRPs. In the non-ideal backhaul, a high latency is present in the information exchange between the multiple TRPs, independent scheduling is appropriate, and ACK/NACK and CSI report are reported to each TRP separately. Usually, this is applicable to multi downlink control information (DCI) scheduling. To be specific, each TRP transmits a physical downlink control channel (PDCCH) of the TRP, each PDCCH schedules a physical downlink shared channel (PDSCH) of the TRP, and multiple control resource sets (CORESET) configured for the UE are associated with different radio resource control (RRC) parameters CORESETPoolIndex and correspond to different TRPs. Multiple PDSCHs scheduled by multiple DCIs may not overlap or may partially overlap or completely overlap on time-frequency resources. On overlapping time-frequency resources, each TRP performs independent precoding based on its own channel, and the UE receives multi layers of data streams of the multiple PDSCHs in a non-coherent joint transmission (NCJT) mode.

In the ideal backhaul, scheduling information and UE feedback information can be exchanged between the multiple TRPs in real time. Not only the multiple PDSCHs can be scheduled by using multiple DCIs, but also a PDSCH can be scheduled by using a single DCI. The following transmission solutions are included.

(1) Space Division scheduling (SDM): Different data layers of a same TB (Transport Block) are transmitted from different TRPs through NCJT.

(2) Frequency Division scheduling (FDM): Different frequency domain resources to which a same redundancy version (RV) of a same TB is mapped are transmitted from different TRPs, or different RVs of a same TB are mapped to different frequency domain resources and transmitted from different TRPs.

(3) Time Division scheduling (TDM): Different RVs of a same TB come from different TRPs repeatedly, for example, repeatedly in one slot, or repeatedly in multiple slots.

In this case, the ACK/NACK feedback and CSI report may be reported to any TRP.

II. Single-TRP CSI Reporting Setting in Rel-16 periodic CSI report (P-CSI): transmitted only on a PUCCH;

semi-persistent CSI report (SP-CSI): transmitted on a PUCCH or a PUSCH; and aperiodic CSI report (AP-CSI): transmitted only on a PUSCH.

III. CSI Reporting Mechanism Based on PUSCH in Rel-16

CSI reporting based on PUSCH supports type 1 wideband or subband CSI and also type 2 CSI.

For feedback of type 1 CSI (Type 1), type 2, and enhanced type 2 based on PUSCH, a CSI report includes two parts (part 1 and part 2), where the part 1 has a fixed payload size and also specifies the number of information bits in the part 2. It should be noted that the part 1 needs to be transmitted completely before the part 2.

For feedback of type 1 CSI, the part 1 may include one or more of RI (Rank Indicator, rank indicator), CRI (CSI-RS Resource Indicator, channel state information reference signal resource indicator), and CQI for a first codeword, and the part 2 includes one or more of PMI and CQI for a second codeword.

For feedback of type 2 CSI, the part 1 includes one or more of RI, a channel quality indicator (CQI), and an indicator of the number of non-zero wideband amplitude coefficients per layer for the type 2 CSI, and the part 2 includes PMI of the type 2 CSI.

For feedback of enhanced type 2 CSI, the part 1 includes RI, CQI, and indicator of the total number of cross-layer non-zero amplitude coefficients for the enhanced type 2 CSI, and type 2 includes a precoding matrix indicator (PMI) of the enhanced type 2 CSI.

When the CSI reported based on PUSCH includes the part 1 and the part 2, the UE may delete some content in part 2 of the CSI. For enhanced type 2 CSI report, group 0 includes indexes $i_{1,1}$, $i_{1,2}$, and $i_{1,8,l}$ (l=1, ..., v); group 1 includes an index $i_{1,5}$ (if reported), $i_{1,6,l}$, a high-priority part $i_{1,7,l}$, $i_{2,3,l}$, a high-priority part $i_{2,4,l}$, and a high-priority part $i_{2,5,l}$ (l=1, ..., v); and group 2 includes a low-priority part $i_{1,7,l}$, a low-priority part $i_{2,4,l}$, and a low-priority part $i_{2,5,l}$ (l=1, ..., v). Specific feedback quantities are shown in Table 1 and Table 2.

TABLE 1

| Feedback quantity | Meaning |
|---|---|
| $i_{1,1}$ | Wideband $[q_1, q_2]_{opt}$, a selected orthogonal DFT vector group number, that is, a rotation number. |
| $i_{1,2}$ | Wideband $[n_1, n_2]^{(i)}$, (i = 0, 1, . . . , L − 1), that is, L orthogonal DFT vector numbers in a selected orthogonal vector group. |
| $i_{1,5}$ | Tap window separator, used to define a start position of a window. Note: It is used when $N_3 > 19$. |
| $i_{1,6,1}[i_{1,6,l}]$ | Taps selected and indicated per layer. |
| $i_{1,7,1}[i_{1,7,l}]$ | Indicating a selected coefficient. To reduce feedback overheads, only non-zero coefficients are reported, and the number of non-zero coefficients per layer cannot exceed K0. Therefore, the number of non-zero coefficients at all layers cannot exceed 2*K0. Note: $i_{1,7,l}$ is a bitmap with a length of 2L * Mv. |
| $i_{1,8,1}[i_{1,8,l}]$ | Indicating a strongest coefficient at a current layer. |

TABLE 2

| Feedback quantity | Meaning |
|---|---|
| $i_{2,3,1}[i_{2,3,l}]$ | Amplitude quantization relationship of strongest coefficients between polarizations. |
| $i_{2,4,1}[i_{2,4,l}]$ | Amplitude quantized value of a coefficient corresponding to Taps. |
| $i_{2,5,1}[i_{2,5,l}]$ | Phase quantized value of the coefficient corresponding to Taps. |

IV CSI Reporting Mechanism Based on PUCCH in Rel-16

Periodic CSI reporting based on PUCCH format 2, 3, or 4 supports wideband type 1 CSI.

Semi-persistent CSI reporting based on PUCCH supports type 1 CSI.

Semi-persistent CSI reporting based on PUCCH format 2 supports type 1 CSI.

Semi-persistent CSI reporting based on PUCCH format 3 or 4 supports wideband and subband type 1 CSI and type 2 CSI Part 1.

In a case that subband type 1 CSI is reported based on PUCCH format 3 or 4, a CSI load may be divided into two parts (part 1 and part 2), where the part 1 includes part or all of RI, CRI, and CQI for a first codeword, and the part 2 includes PMI and CQI for a second codeword (when RI>4, there are two codewords).

If a CSI report includes two parts, the UE may delete content of some of part 2 CSI, according to the same priority order as reporting based on PUSCH.

V. Potential CSI Framework for Multiple TRPs

In the current protocol, "multi-TRP or multi-panel" is specifically defined in terms of a CSI reporting setting, report content, a CSI resource setting, and the like. There are the following methods:

(1) Multiple CSI reporting settings are configured, where a resource setting of each reporting setting corresponds to one TRP, that is, each CSI reporting setting corresponds to CSI reporting of one TRP.

(2) A base station configures one CSI reporting setting, which considers by default or indicates that multiple CSI resource settings or multiple CSI resources are used to jointly (jointly) calculate one CSI report, and in particular, to jointly calculate one CQI. In a CSI report, one PMI and/or RI may be obtained by using a CSI resource setting or CSI resource determined based on a CSI, and then one CQI is determined based on these PMIs/RIs respectively or jointly (meaning of one CQI: as defined in the current protocol, the CQI may include a wideband or subband CQI of one or two codewords).

(3) A CSI report fed back by a terminal to multiple TRPs includes CSI of DPS corresponding to one TRP, and indication information of another TRP for indicating that the another TRP should not schedule the terminal; and/or includes CSI corresponding to at least two TRPs, where the terminal feeds back CSI of NCJT corresponding to each TRP.

(4) A network may configure the terminal to report a specific type of CSI or multiple types of CSI.

(5) A CSI report may further include TRP information of multiple TRPs corresponding to CSI.

A method for processing channel state information according to the embodiments of this application is hereinafter described in detail by using specific embodiments and application scenarios thereof with reference to the accompanying drawings.

Figure 2:
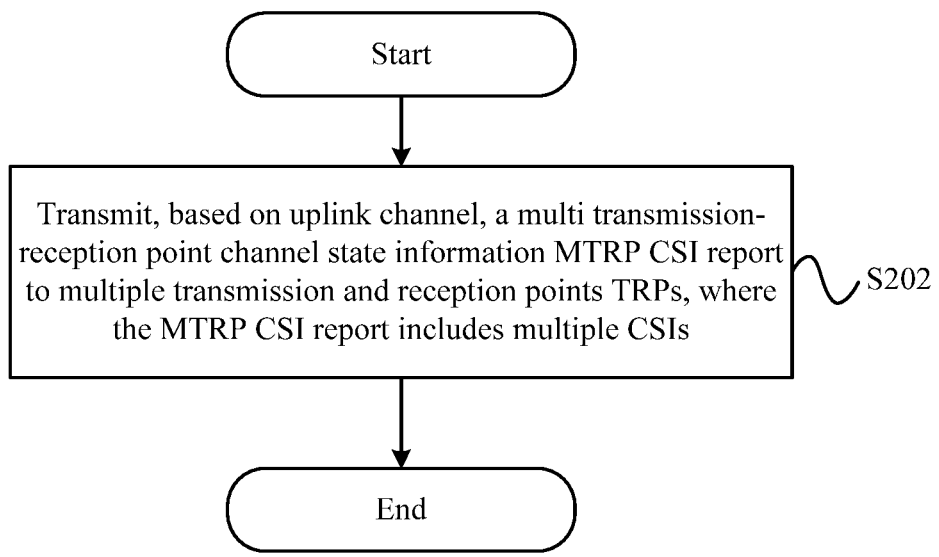
FIG. 2 is a flowchart of a method for processing channel state information according to an embodiment of this application.

FIG. 2 is a flowchart of a method for processing channel state information according to an embodiment of this application. The method is performed by a terminal. As shown in FIG. 2, the method includes the following step.

S202. Transmit, based on uplink channel, a multi transmission-reception point channel state information MTRP CSI report to multiple transmission-reception points TRPs, where the MTRP CSI report includes multiple CSIs.

In S202 of this embodiment of this application, because the MTRP CSI report includes the multiple CSIs, a correspondence between the multiple CSIs and the multiple TRPs is implemented by transmitting the MTRP CSI report to the multiple TRPs, that is, feedback of the multiple CSIs in the MTRP CSI report can be well implemented. In this way, a problem in the prior art that efficiency of CSI reporting is low because each CSI reporting setting corresponds to reporting to one TRP is resolved, and efficiency of CSI reporting is improved.

It should be noted that uplink channels in this embodiment of this application are preferably a PUSCH and a PUCCH. This application is hereinafter explained and described with reference to the two types of uplink channels.

In an optional implementation of this embodiment of this application, in a case that the uplink channel is a physical uplink shared channel PUSCH, a manner of transmitting, based on the uplink channel, the MTRP CSI report to the multiple TRPs in S202 may include at least one of the following:

S202-11. Have all or part of the CSIs in the MTRP CSI report carried on multiple PUSCH repetition resources respectively, and report the all or part of the CSIs to the multiple TRPs, where each PUSCH repetition resource is configured with a different first parameter, and one PUSCH repetition resource corresponds to one first parameter.

In a specific application scenario, a network side may configure or activate PUSCH repetition resources configured with different spatial relation or power control parameters, all or part of the CSIs are carried on multiple PUSCH repetition resources respectively reported to the multiple transmission-reception points TRPs (on the network side), where each PUSCH repetition resource corresponds to one TRP, spatial relation, or power control parameter.

S202-12. Have all or part of the CSIs in the MTRP CSI report carried on multiple PUSCH resources respectively, and report the all or part of the CSIs to the multiple TRPs, where one piece of downlink control information triggers multiple PUSCH resources, and each PUSCH resource corresponds to one second parameter.

In a specific application scenario, one DCI may trigger multiple PUSCH resources, all or part of the CSIs are carried on multiple PUSCH resources respectively and reported to the multiple TRPs, where each PUSCH corresponds to one TRP, spatial relation, SRI, power control, TPMI, or MCS parameter, other information indicated by a DCI field, or one RRC configuration parameter.

It should be noted that the first parameter or the second parameter in this embodiment of this application includes at least one of the following: a spatial relation, power control, first information, second information, and a radio resource control RRC configuration parameter, where the first information includes at least one of the following information indicated by a DCI field in the DCI: a sounding reference signal resource indicator SRI, a precoding matrix indicator TPMI, and a modulation and coding scheme MCS; and the second information includes information indicated by the DCI field in the DCI except the first information.

In another optional implementation of this embodiment of this application, in a case that the uplink channel is a physical uplink control channel PUCCH, a manner of transmitting, based on the uplink channel, the MTRP CSI report to the multiple TRPs in S202 includes at least one of the following:

S202-21. Have all or part of the CSIs in the MTRP CSI report carried on multiple PUCCH repetition resources respectively, and report the all or part of the CSIs to the multiple TRPs, where each PUCCH repetition resource is configured with a different first parameter, and one PUCCH repetition resource corresponds to one first parameter.

In a specific application scenario, PUCCH repetition resources configured with different spatial relations may be configured or activated, all or part of the CSIs are carried on multiple PUCCH repetition resources respectively and reported to the multiple TRPs, where each PUCCH repetition resource corresponds to one TRP, spatial relation, or power control parameter.

S202-21. Have all or part of the CSIs in the MTRP CSI report carried on multiple PUCCH resources respectively, and report the all or part of the CSIs to the multiple TRPs, where one CSI report setting is associated with multiple PUCCH resources, and each PUCCH resource corresponds to one second parameter.

In a specific application scenario, one report may be associated with multiple PUCCH resources, and each PUCCH resource corresponds to one TRP, spatial relation, or power control parameter.

It should be noted that, for PUSCH/PUCCH repetition resources configured with different spatial relations, the CSI is mapped onto different repetition resources; where the repetition resources include at least one of the following: PUSCH repetition resources and PUCCH repetition resources.

For example, in a case that the first repetition resource and the second repetition resource are different repetition resources, there are the following two manners for content included in the first repetition resource and the second repetition resource.

Manner 1: Content on the first repetition resource includes at least one of the following: uplink control information UCI corresponding to a first TRP and common part content; and content on the second repetition resource includes at least one of the following: UCI corresponding to a second TRP and common part content; or Manner 2: content on the first repetition resource includes at least one of the following: UCI corresponding to a first TRP, UCI corresponding to a second TRP, and common part content; and content on the second repetition resource includes at least one of the following: UCI corresponding to the first TRP, UCI corresponding to the second TRP, and common part content, where the common part content is a reporting parameter shared by the first TRP and the second TRP; and the reporting parameter includes at least one of the following: channel state information reference signal resource indicator CRI, PMI, rank indicator RI, channel quality indicator CQI, reference signal received power (RSRP), composite codebook index i1, a synchronization signal block resource indicator (SSBRI), a signal to interference plus noise ratio (SINR), and a layer indicator (LI).

Assuming that the number of repetitions is 4, the following illustrates a mapping relationship of the CSI. In a case that the number of repetitions is 4, the first and second repetition resources may have different spatial relations, and the corresponding CSI may be mapped to both the first repetition and the second repetition.

In another optional implementation of this embodiment of this application, before the MTRP CSI report is transmitted based on the uplink channel to the multiple TRPs, the method in this embodiment of this application may further include the following step.

S21. Divide the MTRP CSI report, where each type of parameter in the divided MTRP CSI report corresponds to one or more TRPs.

In S21, after the MTRP CSI report is divided, each type of parameter in the divided MTRP CSI report corresponds to one or more TRPs, so that the following is avoided in the prior art: Content included in part 1 and part 2 in one CSI in the prior art belongs to CSI of one TRP, and multiple CSIs of multiple TRPs cannot be supported.

Based on S21, in a case that the divided MTRP CSI report is transmitted based on PUSCH, if part 1 and part 2 of the CSI are both extended, that each type of parameter corresponds to one or more TRPs includes at least one of the following:

(1) For feedback of CSI whose precoding codebook type is type 1, one or more third parameters in the part 1 correspond to one or more TRPs, and one or more fourth parameters in the part 2 correspond to one or more TRPs, where the third parameter includes at least one of the following: rank indicator RI, CRI, and CQI for a first codeword, and the fourth parameter includes at least one of the following: PMI and CQI for a second codeword.

In a specific application scenario, the part 1 may include one or more of the following: one or more RIs correspond to one or more TRPs, one or more CRIs (CSI RS resource indicator) correspond to one or more TRPs, and one or more CQIs for a first codeword correspond to one or more TRPs; and the part 2 includes one or more of the following: one or more PMIs correspond to one or more TRPs, and one or more CQIs for a second codeword correspond to one or more TRPs.

(2) For feedback of CSI whose precoding codebook type is type 2, one or more fifth parameters in the part 1 correspond to one or more TRPs, and one or more sixth parameters in the part 2 correspond to one or more TRPs, where the fifth parameter includes at least one of the following: RI, CRI, CQI, and indicator of the number of non-zero wideband amplitude coefficients per layer for the type 2 CSI, and the sixth parameter includes a parameter for constructing PMI of type 2.

In a specific application scenario, the part 1 may include one or more of the following: one or more RIs correspond to one or more TRPs, one or more CRIs correspond to one or more TRPs, one or more CQIs correspond to one or more TRPs, and one or more indicators of the number of non-zero wideband amplitude coefficients per layer for the type 2 CSI correspond to one or more TRPs; and the part 2 includes one or more of the following: one or more PMIs of the type 2 CSI correspond to one or more TRPs.

(3) For feedback of CSI whose precoding codebook type is enhanced type 2, one or more seventh parameters in the part 1 correspond to one or more TRPs, and one or more eighth parameters in the part 2 correspond to one or more TRPs, where the seventh parameter includes at least one of the following: RI, CRI, CQI, and indicator of the total number of cross-layer non-zero amplitude coefficients for the enhanced type 2 CSI, and the eighth parameter includes PMI of the enhanced type 2 CSI.

In a specific application scenario, the part 1 may include one or more of the following: one or more RIs correspond to one or more TRPs, one or more CRIs correspond to one or more TRPs, one or more CQIs correspond to one or more TRPs, and one or more indicators of the total number of cross-layer non-zero amplitude coefficients for the enhanced type 2 CSI correspond to one or more TRPs; and the part 2 includes one or more of the following: one or more PMIs of the enhanced type 2 CSI correspond to one or more TRPs.

Based on S21, in an optional implementation of this embodiment of this application, in a case that the divided MTRP CSI report is transmitted based on PUSCH, if only part 2 of the CSI is extended, that each type of parameter corresponds to one or more TRPs includes at least one of the following:

(1) For feedback of CSI whose precoding codebook type is type 1, one or more ninth parameters in the part 2 correspond to one or more TRPs, where the ninth parameter includes at least one of the following: RI, CRI, CQI for a first codeword, PMI, and CQI for a second codeword.

In a specific application scenario, the part 2 may include one or more of the following: one or more RIs correspond to one or more TRPs, one or more CRIs correspond to one or more TRPs, one or more CQIs for a first codeword correspond to one or more TRPs, one or more PMIs correspond to one or more TRPs, and one or more CQIs for a second codeword correspond to one or more TRPs.

(2) For feedback of CSI whose precoding codebook type is type 2, one or more tenth parameters in the part 2 correspond to one or more TRPs, where the tenth parameter includes at least one of the following: RI, CRI, CQI, indicator of the number of non-zero wideband amplitude coefficients per layer for the type 2 CSI, and PMI of the type 2 CSI.

In a specific application scenario, the part 2 may include one or more of the following: one or more RIs correspond to one or more TRPs, one or more CRIs correspond to one or more TRPs, one or more CQIs correspond to one or more TRPs, one or more indicators of the number of non-zero wideband amplitude coefficients per layer for the type 2 CSI correspond to one or more TRPs, and one or more PMIs of the type 2 CSI correspond to one or more TRPs.

(3) For feedback of CSI whose precoding codebook type is enhanced type 2, one or more eleventh parameters in the part 2 correspond to one or more TRPs, where the eleventh parameter includes at least one of the following: RI, CRI, CQI, indicator of the number of non-zero wideband amplitude coefficients per layer for the enhanced type 2 CSI, and PMI of the enhanced type 2 CSI.

In a specific application scenario, the part 2 may include one or more of the following: one or more RIs correspond to one or more TRPs, one or more CRIs correspond to one or more TRPs, one or more CQIs correspond to one or more TRPs, one or more indicators of the total number of cross-layer non-zero amplitude coefficients for the enhanced type 2 CSI correspond to one or more TRPs, and one or more PMIs of the enhanced type 2 CSI correspond to one or more TRPs.

Based on S21, in an optional implementation of this embodiment of this application, in a case that the divided MTRP CSI report is transmitted based on PUCCH, if part 1 and part 2 of the CSI are both extended, that each type of parameter corresponds to one or more TRPs includes at least one of the following:

(1) For feedback of CSI whose precoding codebook type is type 1, one or more twelfth parameters in the part 1 correspond to one or more TRPs, and one or more thirteenth parameters in the part 2 correspond to one or more TRPs, where the twelfth parameter includes at least one of the following: RI, CRI, and CQI for a first codeword, and the thirteenth parameter includes at least one of the following: PMI and CQI for a second codeword.

In a specific application scenario, the part 1 may include one or more of the following: one or more RIs correspond to one or more TRPs, one or more CRIs correspond to one or more TRPs, and one or more CQIs for a first codeword correspond to one or more TRPs; and the part 2 includes one or more of the following: one or more PMIs correspond to one or more TRPs, and one or more CQIs for a second codeword correspond to one or more TRPs.

(2) For feedback of CSI whose precoding codebook type is type 2, one or more fourteenth parameters in the part 1 correspond to one or more TRPs, where the fourteenth parameter includes at least one of the following: RI, CRI, CQI, and indicator of the number of non-zero wideband amplitude coefficients per layer for the type 2 CSI.

In a specific application scenario, the part 1 may include one or more of the following: one or more RIs correspond to one or more TRPs, one or more CRIs correspond to one or more TRPs, one or more CQIs correspond to one or more TRPs, and one or more indicators of the number of non-zero wideband amplitude coefficients per layer for the type 2 CSI correspond to one or more TRPs.

Based on S21, in an optional implementation of this embodiment of this application, in a case that the divided MTRP CSI report is transmitted based on PUCCH, if only part 2 of the CSI is extended, that each type of parameter corresponds to one or more TRPs includes at least one of the following:

(1) For feedback of CSI whose precoding codebook type is type 1, one or more fifteenth parameters in the part 2 correspond to one or more TRPs, where the fifteenth parameter includes at least one of the following: RI, CRI, CQI for a first codeword, PMI, and CQI for a second codeword.

In a specific application scenario, the part 2 may include one or more of the following: one or more RIs correspond to one or more TRPs, one or more CRIs correspond to one or more TRPs, one or more CQIs for a first codeword correspond to one or more TRPs, one or more PMIs correspond to one or more TRPs, and one or more CQIs for a second codeword correspond to one or more TRPs.

(2) For feedback of CSI whose precoding codebook type is type 2, one or more sixteenth parameters in the part 2 correspond to one or more TRPs, where the sixteenth parameter includes at least one of the following: RI, CRI, CQI, and indicator of the number of non-zero wideband amplitude coefficients per layer for the type 2 CSI.

In another optional implementation of this embodiment of this application, before the MTRP CSI report is transmitted based on the uplink channel to the TRPs, the method in this embodiment of this application may further include the following step.

S201. Delete part 2 of CSI according to ascending order of priorities of CSI reports.

In the prior art, each CSI reporting setting corresponds to reporting to one TRP, resulting in that multiple CSIs of multiple TRPs cannot be supported. In S22, the CSI in the part 2 may be deleted according to ascending order of priorities of CSI reports, so that deletion of multiple CSIs of multiple TRPs can be better supported.

Based on S22, the priorities in this embodiment of this application may include the following cases.

(1) In a case that the divided MTRP CSI report is transmitted based on PUSCH, for feedback of CSI whose precoding codebook type is type 1, the priorities include first priorities, where a descending order of the first priorities is: Part 2 wideband CSI corresponding to one or more TRPs for all CSI reports, Part 2 subband CSI of even subbands corresponding to one or more TRPs for a first CSI report, Part 2 subband CSI of odd subbands corresponding to one or more TRPs for the first CSI report, Part 2 subband CSI of even subbands corresponding to one or more TRPs for a second CSI report, Part 2 subband CSI of odd subbands corresponding to one or more TRPs for the second CSI report, and so on, until Part 2 subband CSI of odd subbands corresponding to one or more TRPs for an $N^{th}$ CSI report.

(2) In the case that the divided MTRP CSI report is transmitted based on PUSCH, for feedback of CSI whose precoding codebook type is type 2, the priorities include second priorities, where a descending order of the second priorities is: Part 2 wideband CSI corresponding to one or more TRPs for all CSI reports, Part 2 subband CSI of even subbands corresponding to one or more TRPs for the first CSI report, Part 2 subband CSI of odd subbands corresponding to one or more TRPs for the first CSI report, Part 2 subband CSI of even subbands corresponding to one or more TRPs for the second CSI report, Part 2 subband CSI of odd subbands corresponding to one or more TRPs for the second CSI report, and so on, until Part 2 subband CSI of odd subbands corresponding to one or more TRPs for the $N^{th}$ CSI report.

(3) In the case that the divided MTRP CSI report is transmitted based on PUSCH, for feedback of CSI whose precoding codebook type is enhanced type 2, the priorities include third priorities, where a descending order of the third priorities is: Part 2 group 0 corresponding to one or more TRPs for all CSI reports, Part 2 group 1 corresponding to one or more TRPs for the first CSI report, Part 2 group 2 corresponding to one or more TRPs for the first CSI report, Part 2 group 1 corresponding to one or more TRPs for the second CSI report, Part 2 group 2 corresponding to one or more TRPs for the second CSI report, and so on, until Part 2 group 2 corresponding to one or more TRPs for the $N^{th}$ CSI report, where the group 0 includes different parameters for constructing PMI, and the parameters for constructing the PMI correspond to one or more TRPs, where the group 0 includes $i_{1,1}$, $i_{1,2}$, and $i_{1,8,l}$ ($l=1, \ldots, v$) corresponding to one or more TRPs, the group 1 includes $i_{1,5}$, $i_{1,6,l}$, $i_{2,3,l}$, and high-priority $i_{1,7,l}$, $i_{2,4,l}$, and $i_{2,5,l}$ ($l=1, \ldots, v$) corresponding to one or more TRPs, and the group 2 includes low-priority $i_{1,7,l}$, $i_{2,4,l}$, and $i_{2,5,l}$ ($l=1, \ldots, v$) corresponding to one or more TRPs.

(4) In the case that the divided MTRP CSI report is transmitted based on PUSCH, for feedback of CSI whose precoding codebook type is type 1, the priorities include fourth priorities, where a descending order of the fourth priorities is: Part 2 one or more RIs, one or more CRIs, and one or more groups of CQIs for a first codeword and corresponding to one or more TRPs for all CSI reports; Part 2 wideband CSI corresponding to one or more TRPs for all CSI reports, Part 2 subband CSI of even subbands corresponding to one or more TRPs for the first CSI report, Part 2 subband CSI of odd subbands corresponding to one or more TRPs for the first CSI report, Part 2 subband CSI of even subbands corresponding to one or more TRPs for the second CSI report, Part 2 subband CSI of odd subbands corresponding to one or more TRPs for the second CSI report, and so on, until Part 2 subband CSI of odd subbands corresponding to one or more TRPs for the $N^{th}$ CSI report.

(5) In the case that the divided MTRP CSI report is transmitted based on PUSCH, for feedback of CSI whose precoding codebook type is type 2, the priorities include fifth priorities, where a descending order of the fifth priorities is: Part 2 one or more RIs, one or more CRIs, one or more groups of CQIs for a first codeword, and one or more indicators of the number of non-zero wideband amplitude coefficients per layer for type 2 CSI and corresponding to one or more TRPs for all CSI reports; Part 2 wideband CSI corresponding to one or more TRPs for all CSI reports, Part 2 subband CSI of even subbands corresponding to one or more TRPs for the first CSI report, Part 2 subband CSI of odd subbands corresponding to one or more TRPs for the first CSI report, Part 2 subband CSI of even subbands corresponding to one or more TRPs for the second CSI report, Part 2 subband CSI of odd subbands corresponding to one or more TRPs for the second CSI report, and so on, until Part 2 subband CSI of odd subbands corresponding to one or more TRPs for the $N^{th}$ CSI report.

(6) In the case that the divided MTRP CSI report is transmitted based on PUSCH, for feedback of CSI whose precoding codebook type is enhanced type 2, the priorities include sixth priorities, where a descending order of the sixth priorities is: Part 2 group 0 corresponding to one or more TRPs for all CSI reports, Part 2 group 1 corresponding to one or more TRPs for all CSI reports, Part 2 group 2 corresponding to one or more TRPs for the first CSI report, Part 2 group 3 corresponding to one or more TRPs for the first CSI report, Part 2 group 2 corresponding to one or more TRPs for the second CSI report, Part 2 group 3 corresponding to one or more TRPs for the second CSI report, and so on, until Part 2 group 3 corresponding to one or more TRPs for the $N^{th}$ CSI report, where the group 0 includes one or more RIs, one or more CRIs, one or more groups of CQIs, and one or more indicators of the total number of cross-layer non-zero amplitude coefficients for the enhanced type 2 CSI, corresponding to one or more TRPs; the group 1 includes $i_{1,1}$, $i_{1,2}$, and $i_{1,8,l}$ (l=1, ..., v) corresponding to one or more TRPs; the group 2 includes $i_{1,5}$, $i_{1,6,l}$, $i_{2,3,l}$, and high-priority $i_{1,7,l}$, $i_{2,4,l}$, and $i_{2,5,l}$ (l=1, ..., v) corresponding to one or more TRPs; and the group 3 includes low-priority $i_{1,7,l}$, $i_{2,4,l}$, and $i_{2,5,l}$ (l=1, ..., v) corresponding to one or more TRPs.

(7) In a case that the divided MTRP CSI report is transmitted based on PUCCH, for feedback of CSI whose precoding codebook type is type 1, the priorities include seventh priorities, where a descending order of the seventh priorities is: Part 2 wideband CSI corresponding to one or more TRPs for all CSI reports, Part 2 subband CSI of even subbands corresponding to one or more TRPs for the first CSI report, Part 2 subband CSI of odd subbands corresponding to one or more TRPs for the first CSI report, Part 2 subband CSI of even subbands corresponding to one or more TRPs for the second CSI report, Part 2 subband CSI of odd subbands corresponding to one or more TRPs for the second CSI report, and so on, until Part 2 subband CSI of odd subbands corresponding to one or more TRPs for the $N^{th}$ CSI report.

(8) In the case that the divided MTRP CSI report is transmitted based on PUCCH, for feedback of CSI whose precoding codebook type is type 1, the priorities include eighth priorities, where a descending order of the eighth priorities is: Part 2 one or more RIs, one or more CRIs, one or more groups of CQIs for a first codeword, and one or more indicators of the number of non-zero wideband amplitude coefficients per layer for type 2 CSI and corresponding to one or more TRPs for all CSI reports; Part 2 wideband CSI corresponding to one or more TRPs for all CSI reports, Part 2 subband CSI of even subbands corresponding to one or more TRPs for the first CSI report, Part 2 subband CSI of odd subbands corresponding to one or more TRPs for the first CSI report, Part 2 subband CSI of even subbands corresponding to one or more TRPs for the second CSI report, Part 2 subband CSI of odd subbands corresponding to one or more TRPs for the second CSI report, and so on, until Part 2 subband CSI of odd subbands corresponding to one or more TRPs for the $N^{th}$ CSI report.

(9) In the case that the divided MTRP CSI report is transmitted based on PUCCH, for feedback of CSI whose precoding codebook type is type 2, the priorities include ninth priorities, where a descending order of the ninth priorities is: Part 2 CSI corresponding to the first CSI report, Part 2 CSI corresponding to the second CSI report, and so on, until Part 2 CSI corresponding to the $N^{th}$ CSI report.

It should be noted that all the CSI reports in the cases (1) to (9) regarding the priorities include the first CSI report to the $N^{th}$ CSI report, where a value of N is an integer greater than 1. In addition, the MTRP CSI report may be included in the first CSI report to the $N^{th}$ CSI report.

Furthermore, it should also be noted that in this embodiment of this application, when a report setting includes CSI of multiple TRPs, if CSI corresponding to one or more TRPs, CSI-RS port groups, CSI-RSs, or CSI-RS sets is deleted, CSI corresponding to other associated TRPs, CSI-RS port groups, CSI-RSs, or CSI-RS sets is also deleted. When multiple report settings correspond to multiple TRPs, if CSI corresponding to one or more TRPs or CSI report settings is deleted, CSI corresponding to other associated TRPs or CSI report settings is also deleted.

In an optional implementation of this embodiment of this application, before the MTRP CSI report is transmitted based on the uplink channel to the TRPs, the method in this embodiment of this application may further include the following step.

S23. Map the CSI in the MTRP CSI report to UCI.

In the prior art, each CSI reporting setting corresponds to reporting to one TRP, resulting in that a mapping from a corresponding CSI report to a UCI bit sequence cannot support multiple CSIs of multiple TRPs. In S23, the CSI in the MTRP CSI report can be mapped to the UCI, and a mapping from the multiple CSIs of the multiple TRPs to the UCI can be supported.

Based on S23, in an optional implementation of this embodiment of this application, in a case that the divided MTRP CSI report is transmitted based on PUSCH, if part 1 and part 2 of the CSI are both extended, the mapped CSI in the MTRP CSI report has at least one of the following features:

(1) Each CSI field of each CSI includes one or more CSI elements, where the one or more CSI elements correspond to one or more TRPs.

(2) All CSI fields in part 1 or part 2 of each CSI are divided into multiple groups, the CSI fields in the CSI are mapped by group, and each group after the mapping includes part of CSI elements in one TRP, where the CSI element includes at least one of the following: CRI, RI, LI, wideband CQI for a first codeword, wideband CQI for a second codeword, subband CQI, indicator of the number of non-zero wideband amplitude coefficients at layer 0, indicator of the number of non-zero wideband amplitude coefficients at layer 1, indicator of a total number of non-zero coefficients at all layers, SINR, SINR difference, PMI wideband information, 2-antenna-port codebook index, even subband CQI for a second codeword, PMI even subband information, even subband 2-antenna-port codebook index, odd subband CQI for a second codeword, PMI odd subband information, and odd subband 2-antenna-port codebook index.

Based on S23, in an optional implementation of this embodiment of this application, in a case that the divided MTRP CSI report is transmitted based on PUSCH, if only part 2 of the CSI is extended, the mapped CSI report in the MTRP CSI report has at least one of the following features:

(1) Each CSI field in part 2 of each CSI includes one or more CSI elements, where the CSI element corresponds to one or more TRPs, and the CSI element includes at least one of the following: CRI, RI, LI, wideband CQI for a first codeword, wideband CQI for a second codeword, subband CQI, indicator of the number of non-zero wideband amplitude coefficients at layer 0, indicator of the number of non-zero wideband amplitude coefficients at layer 1, indicator of a total number of non-zero coefficients at all layers, SINR, SINR difference, PMI wideband information, 2-antenna-port codebook index, even subband CQI for a second codeword, PMI even subband information, even subband 2-antenna-port codebook index, odd subband CQI for a second codeword, PMI odd subband information, and odd subband 2-antenna-port codebook index.

(2) All CSI fields in part 2 of each CSI are divided into multiple groups, where part of the multiple groups are special groups, each special group corresponds to part of CSI elements in one TRP, and the CSI element includes at least one of the following: CRI, RI, wideband CQI for a first codeword, subband CQI, indicator of the number of non-zero wideband amplitude coefficients at layer 0, indicator of the number of non-zero wideband amplitude coefficients at layer 1, PMI, and indicator of a total number of non-zero coefficients at all layers; and CSI fields in other groups than the special groups in the multiple groups are mapped by group, and each group after the mapping includes part of CSI elements in one TRP, where the CSI element includes at least one of the following: LI, PMI wideband information, 2-antenna-port codebook index, even subband CQI for a second codeword, PMI even subband information, even subband 2-antenna-port codebook index, odd subband CQI for a second codeword, PMI odd subband information, and odd subband 2-antenna-port codebook index.

Based on S23, in an optional implementation of this embodiment of this application, in a case that the divided MTRP CSI report is transmitted based on PUCCH, if part 1 and part 2 of the CSI are both extended, the mapped CSI in the MTRP CSI report has at least one of the following features:

(1) Each CSI field includes one or more CSI elements, where the CSI element corresponds to one or more TRPs.

(2) All CSI fields in part 1 or part 2 of each CSI are divided into multiple groups, the CSI fields in the CSI are mapped by group, and each group after the mapping includes part of CSI elements in one TRP, where the CSI element includes at least one of the following: CRI, RI, LI, wideband CQI for a first codeword, wideband CQI for a second codeword, subband CQI, indicator of the number of non-zero wideband amplitude coefficients at layer 0, indicator of the number of non-zero wideband amplitude coefficients at layer 1, PMI, PMI wideband information, and 2-antenna-port codebook index.

Based on S23, in an optional implementation of this embodiment of this application, in a case that the divided MTRP CSI report is transmitted based on PUCCH, if only part 2 of the CSI is extended, the mapped CSI report in the MTRP CSI report has at least one of the following features:

(1) Each CSI field in part 2 of each CSI includes one or more CSI elements, where the CSI element corresponds to one or more TRPs, and the CSI element includes at least one of the following: CRI, RI, LI, wideband CQI for a first codeword, wideband CQI for a second codeword, subband CQI, indicator of the number of non-zero wideband amplitude coefficients at layer 0, indicator of the number of non-zero wideband amplitude coefficients at layer 1, PMI, PMI wideband information, and 2-antenna-port codebook index.

(2) All CSI fields in part 2 of each CSI report are divided into multiple groups, where the multiple groups include special groups, each special group corresponds to part of CSI elements in one TRP, and the CSI element includes at least one of the following: CRI, RI, wideband CQI for a first codeword, subband CQI, indicator of the number of non-zero wideband amplitude coefficients at layer 0, indicator of the number of non-zero wideband amplitude coefficients at layer 1, and PMI; and CSI fields in other groups of CSI than the special groups in the multiple groups are mapped by group, and each group after the mapping includes part of CSI elements in one TRP, where the CSI element includes at least one of the following: LI, PMI wideband information, and 2-antenna-port codebook index.

The following illustrates a mapping sequence in this embodiment of this application with reference to specific implementations.

Manner 1: When the CSI report is reported based on PUSCH, and the part 1 and the part 2 are both extended, possible implementations of CSI report composition and mapping sequences in various configurations are shown in Table 3 to Table 6. Table 3 is a mapping sequence of CSI fields for CSI report part 1. Table 4 is a mapping sequence of CSI fields for CSI report part 2 wideband. Table 5 is a mapping sequence of CSI fields for CSI report part 2 subband. Table 6 is a mapping sequence of CSI fields for CSI report part 2, where codebookType=typeIIr16 or typeII-PortSelection-r16.

TABLE 3

| | CSI fields |
|---|---|
| CSI report Part 1 | If reported, one or more CRIs correspond to one or more TRPs.<br>If reported, one or more RIs (rank indicator) correspond to one or more TRPs.<br>If reported, one or more wideband CQIs for a first codeword correspond to one or more TRPs.<br>If reported, one or more subband CQIs for a first codeword correspond to one or more TRPs.<br>If reported, one or more indicators of the number of non-zero wideband amplitude coefficients at a layer 0 correspond to one or more TRPs.<br>If reported, one or more indicators of the number of non-zero wideband amplitude coefficients at a layer 1 correspond to one or more TRPs (if a rank of the one or more reported RIs is equal to 1, all bits of the field corresponding to the one or more TRPs are set to 0).<br>If reported, one or more PMIs correspond to one or more TRPs.<br>If reported, one or more indicators of a sum of non-zero coefficients at all layers correspond to one or more TRPs.<br>If reported, one or more SINRs correspond to one or more TRPs. |

TABLE 4

| | CSI fields |
|---|---|
| CSI report Part2 wideband | If reported, one or more wideband CQIs for a second codeword correspond to one or more TRPs.<br>If reported, one or more LIs (Layer indicator) correspond to one or more TRPs.<br>If reported, one or more PMI wideband information fields X1 correspond to one or more TRPs.<br>If reported, one or more PMI wideband information fields X2 correspond to one or more TRPs; or if pmiFormatIndicator = widebandPMI, one or more 2-antenna-port codebook indexes correspond to one or more TRPs. |

TABLE 5

| | CSI fields |
|---|---|
| CSI report Part2 subband | If reported and cqi-FormatIndicator = subbandCQI, one or more even subband CQIs for a second codeword correspond to one or more TRPs. If reported and pmi-FormatIndicator = subbandPMI, one or more PMI even subband information fields X1 correspond to one or more TRPs; or if reported and pmi-FormatIndicator = subbandPMI, one or more even subband 2-antenna-port codebook indexes correspond to one or more TRPs. If reported and cqi-FormatIndicator = subbandCQI, one or more odd subband CQIs for a second codeword correspond to one or more TRPs. If reported and pmi-FormatIndicator = subbandPMI, one or more PMI odd subband information fields X1 correspond to one or more TRPs; or if reported and pmi-FormatIndicator = subbandPMI, one or more odd subband 2-antenna-port codebook indexes correspond to one or more TRPs. |

TABLE 6

| | CSI fields |
|---|---|
| CSI report Part2 Group 0 | A group 0 includes $i_{1,1}, i_{1,2},$ and $i_{1,8,l}$ ($l = 1, \ldots, v$) corresponding to one or more TRPs. |
| CSI report Part2 Group 1 | A group 1 includes $i_{1,5}, i_{1,6,l}, i_{2,3,l},$ and high-priority $i_{1,7,l},$ $i_{2,4,l},$ and $i_{2,5,l}$ ($l = 1, \ldots, v$) corresponding to one or more TRPs. |
| CSI report Part2 Group 2 | A group 2 includes low-priority $i_{1,7,l}, i_{2,4,l},$ and $i_{2,5,l}$ ($l = 1, \ldots, v$) corresponding to one or more TRPs. |

Manner 2: When the CSI report is reported based on PUSCH, and the part 1 and the part 2 are both extended, possible implementations of CSI report composition and mapping sequences in various configurations are shown in Table 7 to Table 9. Table 7 is a mapping sequence of CSI fields in part 1 of a CSI report. Table 8 is a mapping sequence of CSI fields for CSI report part 2 wideband. Table 9 is a mapping sequence of CSI fields for CSI report part 2 subband.

TABLE 7

| | CSI fields |
|---|---|
| CSI report Part1 | If reported, one CRI corresponds to the first TRP. If reported, one RI (rank indicator) corresponds to the first TRP. If reported, one wideband CQI for a first codeword corresponds to the first TRP. If reported, one subband CQI for a first codeword corresponds to the first TRP. If reported, one indicator of the number of non-zero wideband amplitude coefficients at a layer 0 corresponds to the first TRP. If reported, one indicator of the number of non-zero wideband amplitude coefficients at a layer 1 corresponds to the first TRP (if a rank of the reported RI of the first TRP is equal to 1, all bits of the field corresponding to the first TRP are set to 0). If reported, one PMI corresponds to the first TRP. If reported, one indicator of a total number of non-zero coefficients at all layers corresponds to the first TRP. If reported, one SINR corresponds to the first TRP. If reported, one SINR difference corresponds to the first TRP. If reported, one CRI corresponds to the second TRP. If reported, one RI (rank indicator) corresponds to the second TRP. If reported, one wideband CQI for a first codeword corresponds to the second TRP. If reported, one subband CQI for a first codeword corresponds to the second TRP. If reported, one indicator of the number of non-zero wideband amplitude coefficients at a layer 0 corresponds to the second TRP. If reported, one indicator of the number of non-zero wideband amplitude coefficients at a layer 1 corresponds to the second TRP (if a rank of the reported RI of the second TRP is equal to 1, all bits of the field corresponding to the second TRP are set to 0). If reported, one PMI corresponds to the second TRP. If reported, one indicator of a total number of non-zero coefficients at all layers corresponds to the second TRP. If reported, one SINR corresponds to the second TRP. If reported, one SINR difference corresponds to the second TRP. The rest is deduced until an $N^{th}$ TRP. |

TABLE 8

| | CSI fields |
|---|---|
| CSI report Part2 wideband | If reported, one wideband CQI for a second codeword corresponds to the first TRP.<br>If reported, one LI (Layer indicator) corresponds to the first TRP.<br>If reported, one PMI wideband information field X1 corresponds to the first TRP.<br>If reported, one PMI wideband information field X2 corresponds to the first TRP; or if pmiFormatIndicator = widebandPMI, one 2-antenna-port codebook index corresponds to the first TRP.<br>If reported, one wideband CQI for a second codeword corresponds to the second TRP.<br>If reported, one LI (Layer indicator) corresponds to the second TRP.<br>If reported, one PMI wideband information field X1 corresponds to the second TRP.<br>If reported, one PMI wideband information field X2 corresponds to the second TRP; or if pmiFormatIndicator = widebandPMI, one 2-antenna-port codebook index corresponds to the second TRP.<br>The rest is deduced until the $N^{th}$ TRP. |

TABLE 9

| | CSI fields |
|---|---|
| CSI report Part2 subband | If reported and cqi-FormatIndicator = subbandCQI, one even subband CQI for a second codeword corresponds to the first TRP.<br>If reported and pmi-FormatIndicator = subbandPMI, one PMI even subband information field X1 corresponds to the first TRP; or if reported and pmi-FormatIndicator = subbandPMI, one even subband 2-antenna-port codebook index corresponds to the first TRP.<br>If reported and cqi-FormatIndicator = subbandCQI, one odd subband CQI for a second codeword corresponds to the first TRP.<br>If reported and pmi-FormatIndicator = subbandPMI, one PMI odd subband information field X1 corresponds to the first TRP; or if reported and pmi-FormatIndicator = subbandPMI, one odd subband 2-antenna-port codebook index corresponds to the first TRP.<br>If reported and cqi-FormatIndicator = subbandCQI, one even subband CQI for a second codeword corresponds to the second TRP.<br>If reported and pmi-FormatIndicator = subbandPMI, one PMI even subband information field X1 corresponds to the second TRP; or if reported and pmi-FormatIndicator = subbandPMI, one even subband 2-antenna-port codebook index corresponds to the second TRP.<br>If reported and cqi-FormatIndicator = subbandCQI, one odd subband CQI for a second codeword corresponds to the second TRP.<br>If reported and pmi-FormatIndicator = subbandPMI, one PMI odd subband information field X1 corresponds to the second TRP; or if reported and pmi-FormatIndicator = subbandPMI, one odd subband 2-antenna-port codebook index corresponds to the second TRP.<br>The rest is deduced until the $N^{th}$ TRP. |

Manner 3: When the CSI report is reported based on PUSCH, and the part 2 is extended, possible implementations of CSI report composition and mapping sequences in various configurations are shown in Table 10 to Table 14. Table 10 is a mapping sequence of CSI fields for CSI report part 2 wideband. Table 11 is a mapping sequence of CSI fields for CSI report part 2 wideband. Table 12 is a mapping sequence of CSI fields for CSI report part 2 subband. Table 13 is a mapping sequence of CSI fields for CSI report part 2 subband. Table 14 is a mapping sequence of CSI fields for CSI report part 2, where codebookType=typeIIr16 or typeII-PortSelection-r16.

TABLE 10

| | CSI fields |
|---|---|
| CSI report Part2 wideband | If reported, one or more CRIs correspond to one or more TRPs.<br>If reported, one or more RIs (rank indicator) correspond to one or more TRPs.<br>If reported, one or more wideband CQIs for a first codeword correspond to one or more TRPs.<br>If reported, one or more subband CQIs for a first codeword correspond to one or more TRPs.<br>If reported, one or more indicators of the number of non-zero wideband amplitude coefficients at a layer 0 correspond to one or more TRPs.<br>If reported, one or more indicators of the number of non-zero wideband amplitude coefficients at a layer 1 correspond to one or more TRPs (if a rank of the one or more reported RIs is equal to 1, all bits of the field |

TABLE 10-continued

| CSI fields |
|---|
| corresponding to the one or more TRPs are set to 0).<br>If reported, one or more PMIs correspond to one or more TRPs.<br>If reported, one or more indicators of a sum of non-zero coefficients at all layers correspond to one or more TRPs.<br>If reported, one or more SINRs correspond to one or more TRPs.<br>If reported, one or more SINR differences correspond to one or more TRPs.<br>If reported, one or more wideband CQIs for a second codeword correspond to one or more TRPs.<br>If reported, one or more LIs (Layer indicator) correspond to one or more TRPs.<br>If reported, one or more PMI wideband information fields X1 correspond to one or more TRPs.<br>If reported, one or more PMI wideband information fields X2 correspond to one or more TRPs; or if pmiFormatIndicator = widebandPMI, one or more 2-antenna-port codebook indexes correspond to one or more TRPs. |

TABLE 11

| | CSI fields |
|---|---|
| CSI report Part2 wideband | If reported, one or more CRIs correspond to one or more TRPs.<br>If reported, one or more RIs (rank indicator) correspond to one or more TRPs.<br>If reported, one or more wideband CQIs for a first codeword correspond to one or more TRPs.<br>If reported, one or more subband CQIs for a first codeword correspond to one or more TRPs.<br>If reported, one or more indicators of the number of non-zero wideband amplitude coefficients at a layer 0 correspond to one or more TRPs.<br>If reported, one or more indicators of the number of non-zero wideband amplitude coefficients at a layer 1 correspond to one or more TRPs (if a rank of the one or more reported RIs is equal to 1, all bits of the field corresponding to the one or more TRPs are set to 0).<br>If reported, one or more PMIs correspond to one or more TRPs.<br>If reported, one or more PMIs correspond to one or more TRPs.<br>If reported, one or more indicators of a sum of non-zero coefficients at all layers correspond to one or more TRPs.<br>If reported, one or more SINRs correspond to one or more TRPs.<br>If reported, one or more SINR differences correspond to one or more TRPs.<br>If reported, one wideband CQI for a second codeword corresponds to the first TRP.<br>If reported, one LI (Layer indicator) corresponds to the first TRP.<br>If reported, one PMI wideband information field X1 corresponds to the first TRP.<br>If reported, one PMI wideband information field X2 corresponds to the first TRP; or if pmiFormatIndicator = widebandPMI, one 2-antenna-port codebook index corresponds to the first TRP.<br>If reported, one wideband CQI for a second codeword corresponds to the second TRP.<br>If reported, one LI (Layer indicator) corresponds to the second TRP.<br>If reported, one PMI wideband information field X1 corresponds to the second TRP.<br>If reported, one PMI wideband information field X2 corresponds to the second TRP; or if pmiFormatIndicator = widebandPMI, one 2-antenna-port codebook index corresponds to the second TRP.<br>The rest is deduced until the $N^{th}$ TRP. |

TABLE 12

| | CSI fields |
|---|---|
| CSI report Part2 subband | If reported, one or more CRIs correspond to one or more TRPs.<br>If reported, one or more RIs (rank indicator) correspond to one or more TRPs.<br>If reported, one or more wideband CQIs for a first codeword correspond to one or more TRPs.<br>If reported, one or more subband CQIs for a first codeword correspond to |

TABLE 12-continued

| CSI fields |
|---|
| one or more TRPs.<br>If reported, one or more indicators of the number of non-zero wideband amplitude coefficients at a layer 0 correspond to one or more TRPs.<br>If reported, one or more indicators of the number of non-zero wideband amplitude coefficients at a layer 1 correspond to one or more TRPs (if a rank of the one or more reported RIs is equal to 1, all bits of the field corresponding to the one or more TRPs are set to 0).<br>If reported, one or more PMIs correspond to one or more TRPs.<br>If reported, one or more indicators of a sum of non-zero coefficients at all layers correspond to one or more TRPs.<br>If reported, one or more SINRs correspond to one or more TRPs.<br>If reported, one or more SINR differences correspond to one or more TRPs.<br>If reported and cqi-FormatIndicator = subbandCQI, one or more even subband CQIs for a second codeword correspond to one or more TRPs.<br>If reported and pmi-FormatIndicator = subbandPMI, one or more PMI even subband information fields X1 correspond to one or more TRPs; or if reported and pmi-FormatIndicator = subbandPMI, one or more even subband 2-antenna-port codebook indexes correspond to one or more TRPs.<br>If reported and cqi-FormatIndicator = subbandCQI, one or more odd subband CQIs for a second codeword correspond to one or more TRPs.<br>If reported and pmi-FormatIndicator = subbandPMI, one or more PMI odd subband information fields X1 correspond to one or more TRPs; or if reported and pmi-FormatIndicator = subbandPMI, one or more odd subband 2-antenna-port codebook indexes correspond to one or more TRPs. |

TABLE 13

| | CSI fields |
|---|---|
| CSI report Part2 subband | If reported, one or more CRIs correspond to one or more TRPs.<br>If reported, one or more RIs (rank indicator) correspond to one or more TRPs.<br>If reported, one or more wideband CQIs for a first codeword correspond to one or more TRPs.<br>If reported, one or more subband CQIs for a first codeword correspond to one or more TRPs.<br>If reported, one or more indicators of the number of non-zero wideband amplitude coefficients at a layer 0 correspond to one or more TRPs.<br>If reported, one or more indicators of the number of non-zero wideband amplitude coefficients at a layer 1 correspond to one or more TRPs (if a rank of the one or more reported RIs is equal to 1, all bits of the field corresponding to the one or more TRPs are set to 0).<br>If reported, one or more PMIs correspond to one or more TRPs.<br>If reported, one or more indicators of a sum of non-zero coefficients at all layers correspond to one or more TRPs.<br>If reported, one or more SINRs correspond to one or more TRPs.<br>If reported, one or more SINR differences correspond to one or more TRPs.<br>If reported and cqi-FormatIndicator = subbandCQI, one even subband CQI for a second codeword corresponds to the first TRP.<br>If reported and pmi-FormatIndicator = subbandPMI, one PMI even subband information field X1 corresponds to the first TRP; or if reported and pmi-FormatIndicator = subbandPMI, one even subband 2-antenna-port codebook index corresponds to the first TRP.<br>If reported and cqi-FormatIndicator = subbandCQI, one odd subband CQI for a second codeword corresponds to the first TRP.<br>If reported and pmi-FormatIndicator = subbandPMI, one PMI odd subband information field X1 corresponds to the first TRP; or if reported and pmi-FormatIndicator = subbandPMI, one odd subband 2-antenna-port codebook index corresponds to the first TRP.<br>If reported and cqi-FormatIndicator = subbandCQI, one even subband CQI for a second codeword corresponds to the second TRP.<br>If reported and pmi-FormatIndicator = subbandPMI, one PMI even subband information field X1 corresponds to the second TRP; or if reported and pmi-FormatIndicator = subbandPMI, one even subband 2-antenna-port codebook index corresponds to the second TRP.<br>If reported and cqi-FormatIndicator = subbandCQI, one odd subband CQI for a second codeword corresponds to the second TRP.<br>If reported and pmi-FormatIndicator = subbandPMI, one PMI odd subband information field X1 corresponds to the second TRP; or if reported and pmi-FormatIndicator = subbandPMI, one odd subband 2- |

TABLE 13-continued

| CSI fields |
| --- |
| antenna-port codebook index corresponds to the second TRP. The rest is deduced until the $N^{th}$ TRP. |

TABLE 14

| | CSI fields |
| --- | --- |
| CSI report Part2 Group 0 | A group 0 includes one or more RIs, one or more CRIs, one or more CQIs, and one or more indicators of the total number of cross-layer non-zero amplitude coefficients for the enhanced type 2 CSI, corresponding to one or more TRPs. |
| CSI report Part2 Group 1 | A group 1 includes $i_{1,-1}$, $i_{1,2}$, and $i_{1,8,l}$ (l = 1, . . . , v) corresponding to one or more TRPs. |
| CSI report Part2 Group 2 | A group 2 includes $i_{1,5}$, $i_{1,6,l}$, $i_{2,3,l}$, and high-priority $i_{1,7,l}$, $i_{2,4,l}$, and $i_{2,5,l}$ (l = 1, . . . , v) corresponding to one or more TRPs. |
| CSI report Part2 Group 3 | A group 3 includes low-priority $i_{1,7,l}$, $i_{2,4,l}$, and $i_{2,5,l}$ (l = 1, . . . , v) corresponding to one or more TRPs. |

Manner 4: When the CSI report is reported based on PUCCH, and the part 1 and the part 2 are extended, possible implementations of CSI report composition and mapping sequences in various configurations are shown in Table 15 to Table 18. Table 15 is a mapping sequence of CSI fields in a CSI report where pmi-FormatIndicator=widebandPMI and cqi-FormatIndicator=widebandCQI. Table 16 is a mapping sequence of CSI fields for CSI report part 1, where pmi-FormatIndicator=subbandPMI and cqi-FormatIndicator=subbandCQI. Table 17 is a mapping sequence of CSI fields for CSI report part 2 wideband, where pmi-FormatIndicator=subbandPMI and cqi-FormatIndicator=subbandCQI. Table 18 is a mapping sequence of CSI fields for CSI report part 2 subband, where pmi-FormatIndicator=subbandPMI or cqi-FormatIndicator=subbandCQI.

TABLE 15

| | CSI fields |
| --- | --- |
| CSI report | If reported, one or more CRIs correspond to one or more TRPs. If reported, one or more RIs (rank indicator) correspond to one or more TRPs. If reported, one or more LIs (Layer indicator) correspond to one or more TRPs. If required, zeros are padded to bits. If reported, one or more PMI wideband information fields X1 correspond to one or more TRPs. If reported, one or more PMI wideband information fields X2 correspond to one or more TRPs. If reported, one or more CQIs for a first codeword correspond to one or more TRPs. If reported, one or more CQIs for a second codeword correspond to one or more TRPs. |

TABLE 16

| | CSI fields |
| --- | --- |
| CSI report Part 1 | If reported, one or more CRIs correspond to one or more TRPs. If reported, one or more RIs (rank indicator) correspond to one or more TRPs. If reported, one or more wideband CQIs for a first codeword correspond to one or more TRPs. If reported, one or more subband CQIs for a first codeword correspond to one or more TRPs. If reported, one or more indicators of the number of non-zero wideband amplitude coefficients at a layer 0 correspond to one or more TRPs. If reported, one or more indicators of the number of non-zero wideband amplitude coefficients at a layer 1 correspond to one or more TRPs (if a rank of the one or more reported RIs is equal to 1, all bits of the field corresponding to the one or more TRPs are set to 0). If reported, one or more PMIs correspond to one or more TRPs. |

TABLE 17

| | CSI fields |
|---|---|
| CSI report Part2 wideband | If reported, one or more wideband CQIs for a second codeword correspond to one or more TRPs.<br>If reported, one or more LIs (Layer indicator) correspond to one or more TRPs.<br>If reported, one or more PMI wideband information fields X1 correspond to one or more TRPs.<br>If reported, one or more PMI wideband information fields X2 correspond to one or more TRPs; or if pmiFormatIndicator = widebandPMI, one or more 2-antenna-port codebook indexes correspond to one or more TRPs. |

TABLE 18

| | CSI fields |
|---|---|
| CSI report Part2 subband | If reported and cqi-FormatIndicator = subbandCQI, one or more even subband CQIs for a second codeword correspond to one or more TRPs.<br>If reported and pmi-FormatIndicator = subbandPMI, one or more PMI even subband information fields X1 correspond to one or more TRPs; or if reported and pmi-FormatIndicator = subbandPMI, one or more even subband 2-antenna-port codebook indexes correspond to one or more TRPs.<br>If reported and cqi-FormatIndicator = subbandCQI, one or more odd subband CQIs for a second codeword correspond to one or more TRPs.<br>If reported and pmi-FormatIndicator = subbandPMI, one or more PMI odd subband information fields X1 correspond to one or more TRPs; or if reported and pmi-FormatIndicator = subbandPMI, one or more odd subband 2-antenna-port codebook indexes correspond to one or more TRPs. |

Manner 5: When the CSI report is reported based on PUCCH, and the part 1 and the part 2 are extended, possible implementations of CSI report composition and mapping sequences in various configurations are shown in Table 19 to Table 22. Table 19 is a mapping sequence of CSI fields in a CSI report where pmi-FormatIndicator=widebandPMI and cqi-FormatIndicator=widebandCQI. Table 20 is a mapping sequence of CSI fields for CSI report part 1, where pmi-FormatIndicator=subbandPMI and cqi-FormatIndicator=subbandCQI. Table 21 is a mapping sequence of CSI fields for CSI report part 2 wideband, where pmi-FormatIndicator=subbandPMI or cqi-FormatIndicator=subbandCQI. Table 22 is a mapping sequence of CSI fields for CSI report part 2 subband, where pmi-FormatIndicator=subbandPMI or cqi-FormatIndicator=subbandCQI.

TABLE 19

| | CSI fields |
|---|---|
| CSI report | If reported, one CRI corresponds to the first TRP.<br>If reported, one RI (rank indicator) corresponds to the first TRP.<br>If reported, one LI (Layer indicator) corresponds to the first TRP.<br>If required, zeros are padded to bits.<br>If reported, one PMI wideband information field X1 corresponds to the first TRP.<br>If reported, one PMI wideband information field X2 corresponds to the first TRP.<br>If reported, one CQI for a first codeword corresponds to the first TRP.<br>If reported, one CQI for a second codeword corresponds to the first TRP.<br>If reported, one CRI corresponds to the second TRP.<br>If reported, one RI (rank indicator) corresponds to the second TRP.<br>If reported, one LI (Layer indicator) corresponds to the second TRP.<br>If required, zeros are padded to bits.<br>If reported, one PMI wideband information field X1 corresponds to the second TRP.<br>If reported, one PMI wideband information field X2 corresponds to the second TRP.<br>If reported, one CQI for a first codeword corresponds to the second TRP.<br>If reported, one CQI for a second codeword corresponds to the second TRP.<br>The rest is deduced until the $N^{th}$ TRP. |

TABLE 20

| | CSI fields |
|---|---|
| CSI report Part1 | If reported, one CRI corresponds to the first TRP.<br>If reported, one RI (rank indicator) corresponds to the first TRP.<br>If reported, one wideband CQI for a first codeword corresponds to the first TRP. |

TABLE 20-continued

| CSI fields |
|---|
| If reported, one subband CQI for a first codeword corresponds to the first TRP.
If reported, one indicator of the number of non-zero wideband amplitude coefficients at a layer 0 corresponds to the first TRP.
If reported, one indicator of the number of non-zero wideband amplitude coefficients at a layer 1 corresponds to the first TRP (if a rank of the reported RI of the first TRP is equal to 1, all bits of the field corresponding to the first TRP are set to 0).
If reported, one PMI corresponds to the first TRP.
If reported, one CRI corresponds to the second TRP.
If reported, one RI (rank indicator) corresponds to the second TRP.
If reported, one wideband CQI for a first codeword corresponds to the second TRP.
If reported, one subband CQI for a first codeword corresponds to the second TRP.
If reported, one indicator of the number of non-zero wideband amplitude coefficients at a layer 0 corresponds to the second TRP.
If reported, one indicator of the number of non-zero wideband amplitude coefficients at a layer 1 corresponds to the second TRP (if a rank of the reported RI of the second TRP is equal to 1, all bits of the field corresponding to the second TRP are set to 0).
If reported, one PMI corresponds to the second TRP.
The rest is deduced until the $N^{th}$ TRP. |

TABLE 21

| | CSI fields |
|---|---|
| CSI report Part2 wideband | If reported, one wideband CQI for a second codeword corresponds to the first TRP.
If reported, one LI (Layer indicator) corresponds to the first TRP.
If reported, one PMI wideband information field X1 corresponds to the first TRP.
If reported, one PMI wideband information field X2 corresponds to the first TRP; or if pmiFormatIndicator = widebandPMI, one 2-antenna-port codebook index corresponds to the first TRP.
If reported, one wideband CQI for a second codeword corresponds to the second TRP.
If reported, one LI (Layer indicator) corresponds to the second TRP.
If reported, one PMI wideband information field X1 corresponds to the second TRP.
If reported, one PMI wideband information field X2 corresponds to the second TRP; or if pmiFormatIndicator = widebandPMI, one 2-antenna-port codebook index corresponds to the second TRP.
The rest is deduced until the $N^{th}$ TRP. |

TABLE 22

| | CSI fields |
|---|---|
| CSI report Part2 subband | If reported and cqi-FormatIndicator = subbandCQI, one even subband CQI for a second codeword corresponds to the first TRP.
If reported and pmi-FormatIndicator = subbandPMI, one PMI even subband information field X1 corresponds to the first TRP; or if reported and pmi-FormatIndicator = subbandPMI, one even subband 2-antenna-port codebook index corresponds to the first TRP.
If reported and cqi-FormatIndicator = subbandCQI, one odd subband CQI for a second codeword corresponds to the first TRP.
If reported and pmi-FormatIndicator = subbandPMI, one PMI odd subband information field X1 corresponds to the first TRP; or if reported and pmi-FormatIndicator = subbandPMI, one odd subband 2-antenna-port codebook index corresponds to the first TRP.
If reported and cqi-FormatIndicator = subbandCQI, one even subband CQI for a second codeword corresponds to the second TRP.
If reported and pmi-FormatIndicator = subbandPMI, one PMI even subband information field X1 corresponds to the second TRP; or if reported and pmi-FormatIndicator = subbandPMI, one even subband 2-antenna-port codebook index corresponds to the second TRP.
If reported and cqi-FormatIndicator = subbandCQI, one odd subband CQI for a second codeword corresponds to the second TRP.
If reported and pmi-FormatIndicator = subbandPMI, one PMI odd subband |

TABLE 22-continued

| CSI fields |
|---|
| information field X1 corresponds to the second TRP; or if reported and pmi-FormatIndicator = subbandPMI, one odd subband 2-antenna-port codebook index corresponds to the second TRP.<br>The rest is deduced until the $N^{th}$ TRP. |

Manner 6: When the CSI report is reported based on PUCCH, and the part 2 is extended, possible implementations of CSI report composition and mapping sequences in various configurations are shown in Table 23 to Table 26. Table 23 is a mapping sequence of CSI fields for CSI report part 2 wideband, where pmi-FormatIndicator=subbandPMI and cqi-FormatIndicator=subbandCQI. Table 24 is a mapping sequence of CSI fields for CSI report part 2 wideband, where pmi-FormatIndicator=subbandPMI or cqi-FormatIndicator=subbandCQI. Table 25 is a mapping sequence of CSI fields for CSI report part 2 subband, where pmi-FormatIndicator=subbandPMI or cqi-FormatIndicator=subbandCQI. Table 26 is a mapping sequence of CSI fields for CSI report part 2 subband, where pmi-FormatIndicator=subbandPMI or cqi-FormatIndicator=subbandCQI.

TABLE 23

| | CSI fields |
|---|---|
| CSI report Part2 wideband | If reported, one or more CRIs correspond to one or more TRPs.<br>If reported, one or more RIs (rank indicator) correspond to one or more TRPs.<br>If reported, one or more wideband CQIs for a first codeword correspond to one or more TRPs.<br>If reported, one or more subband CQIs for a first codeword correspond to one or more TRPs.<br>If reported, one or more indicators of the number of non-zero wideband amplitude coefficients at a layer 0 correspond to one or more TRPs.<br>If reported, one or more indicators of the number of non-zero wideband amplitude coefficients at a layer 1 correspond to one or more TRPs (if a rank of the one or more reported RIs is equal to 1, all bits of the field corresponding to the one or more TRPs are set to 0).<br>If reported, one or more PMIs correspond to one or more TRPs.<br>If reported, one or more wideband CQIs for a second codeword correspond to one or more TRPs.<br>If reported, one or more LIs (Layer indicator) correspond to one or more TRPs.<br>If reported, one or more PMI wideband information fields X1 correspond to one or more TRPs.<br>If reported, one or more PMI wideband information fields X2 correspond to one or more TRPs; or if pmiFormatIndicator = widebandPMI, one or more 2-antenna-port codebook indexes correspond to one or more TRPs. |

TABLE 24

| | CSI fields |
|---|---|
| CSI report Part2 wideband | If reported, one or more CRIs correspond to one or more TRPs.<br>If reported, one or more RIs (rank indicator) correspond to one or more TRPs.<br>If reported, one or more wideband CQIs for a first codeword correspond to one or more TRPs.<br>If reported, one or more subband CQIs for a first codeword correspond to one or more TRPs.<br>If reported, one or more indicators of the number of non-zero wideband amplitude coefficients at a layer 0 correspond to one or more TRPs.<br>If reported, one or more indicators of the number of non-zero wideband amplitude coefficients at a layer 1 correspond to one or more TRPs (if a rank of the one or more reported RIs is equal to 1, all bits of the field corresponding to the one or more TRPs are set to 0).<br>If reported, one or more PMIs correspond to one or more TRPs.<br>If reported, one wideband CQI for a second codeword corresponds to the first TRP.<br>If reported, one LI (Layer indicator) corresponds to the first TRP.<br>If reported, one PMI wideband information field X1 corresponds to the first TRP.<br>If reported, one PMI wideband information field X2 corresponds to the first TRP; or if pmiFormatIndicator = widebandPMI, one 2-antenna-port codebook index corresponds to the first TRP.<br>If reported, one wideband CQI for a second codeword corresponds to the second TRP.<br>If reported, one LI (Layer indicator) corresponds to the second TRP.<br>If reported, one PMI wideband information field X1 corresponds to the second |

TABLE 24-continued

| CSI fields |
| --- |
| TRP.<br>If reported, one PMI wideband information field X2 corresponds to the second TRP; or if pmiFormatIndicator = widebandPMI, one 2-antenna-port codebook index corresponds to the second TRP.<br>The rest is deduced until the $N^{th}$ TRP. |

TABLE 25

| | CSI fields |
| --- | --- |
| CSI report Part2 subband | If reported, one or more CRIs correspond to one or more TRPs.<br>If reported, one or more RIs (rank indicator) correspond to one or more TRPs.<br>If reported, one or more wideband CQIs for a first codeword correspond to one or more TRPs.<br>If reported, one or more subband CQIs for a first codeword correspond to one or more TRPs.<br>If reported, one or more indicators of the number of non-zero wideband amplitude coefficients at a layer 0 correspond to one or more TRPs.<br>If reported, one or more indicators of the number of non-zero wideband amplitude coefficients at a layer 1 correspond to one or more TRPs (if a rank of the one or more reported RIs is equal to 1, all bits of the field corresponding to the one or more TRPs are set to 0).<br>If reported, one or more PMIs correspond to one or more TRPs.<br>If reported and cqi-FormatIndicator = subbandCQI, one or more even subband CQIs for a second codeword correspond to one or more TRPs.<br>If reported and pmi-FormatIndicator = subbandPMI, one or more PMI even subband information fields X1 correspond to one or more TRPs; or if reported and pmi-FormatIndicator = subbandPMI, one or more even subband 2-antenna-port codebook indexes correspond to one or more TRPs.<br>If reported and cqi-FormatIndicator = subbandCQI, one or more odd subband CQIs for a second codeword correspond to one or more TRPs.<br>If reported and pmi-FormatIndicator = subbandPMI, one or more PMI odd subband information fields X1 correspond to one or more TRPs; or if reported and pmi-FormatIndicator = subbandPMI, one or more odd subband 2-antenna-port codebook indexes correspond to one or more TRPs. |

TABLE 26

| | CSI fields |
| --- | --- |
| CSI report Part2 subband | If reported, one or more CRIs correspond to one or more TRPs.<br>If reported, one or more RIs (rank indicator) correspond to one or more TRPs.<br>If reported, one or more wideband CQIs for a first codeword correspond to one or more TRPs.<br>If reported, one or more subband CQIs for a first codeword correspond to one or more TRPs.<br>If reported, one or more indicators of the number of non-zero wideband amplitude coefficients at a layer 0 correspond to one or more TRPs.<br>If reported, one or more indicators of the number of non-zero wideband amplitude coefficients at a layer 1 correspond to one or more TRPs (if a rank of the one or more reported RIs is equal to 1, all bits of the field corresponding to the one or more TRPs are set to 0).<br>If reported, one or more PMIs correspond to one or more TRPs.<br>If reported and cqi-FormatIndicator = subbandCQI, one even subband CQI for a second codeword corresponds to the first TRP.<br>If reported and pmi-FormatIndicator = subbandPMI, one PMI even subband information field X1 corresponds to the first TRP; or if reported and pmi-FormatIndicator = subbandPMI, one even subband 2-antenna-port codebook index corresponds to the first TRP.<br>If reported and cqi-FormatIndicator = subbandCQI, one odd subband CQI for a second codeword corresponds to the first TRP.<br>If reported and pmi-FormatIndicator = subbandPMI, one PMI odd subband information field X1 corresponds to the first TRP; or if reported and pmi-FormatIndicator = subbandPMI, one odd subband 2-antenna-port codebook index corresponds to the first TRP.<br>If reported and cqi-FormatIndicator = subbandCQI, one even subband CQI for a second codeword corresponds to the second TRP.<br>If reported and pmi-FormatIndicator = subbandPMI, one PMI even subband information field X1 corresponds to the second TRP; or if reported and pmi- |

TABLE 26-continued

CSI fields

FormatIndicator = subbandPMI, one even subband 2-antenna-port codebook index corresponds to the second TRP.
If reported and cqi-FormatIndicator = subbandCQI, one odd subband CQI for a second codeword corresponds to the second TRP.
If reported and pmi-FormatIndicator = subbandPMI, one PMI odd subband information field X1 corresponds to the second TRP; or if reported and pmi-FormatIndicator = subbandPMI, one odd subband 2-antenna-port codebook index corresponds to the second TRP.
The rest is deduced until the $N^{th}$ TRP.

It should be noted that the method for processing channel state information according to the embodiments of this application may be performed by an apparatus for processing channel state information, or a control module for performing the method for processing channel state information in the apparatus for processing channel state information. The apparatus for processing channel state information according to the embodiments of this application is described by assuming that the method for processing channel state information is performed by the apparatus for processing channel state information in the embodiments of this application.

Figure 3:
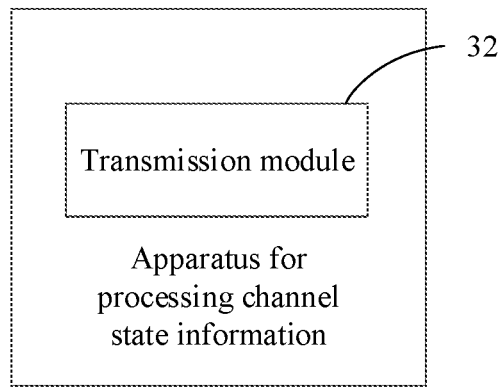
FIG. 3 is a first schematic diagram of a structure of an apparatus for processing channel state information according to an embodiment of this application.

FIG. 3 is a schematic diagram of a structure of an apparatus for processing channel state information according to an embodiment of this application. The apparatus is applied to a terminal side. As shown in FIG. 3, the apparatus includes:

a transmission module 32, configured to transmit, based on uplink channel, a multi transmission-reception point channel state information MTRP CSI report to multiple transmission-reception points TRPs, where the MTRP CSI report includes multiple CSIs.

In this embodiment of this application, because the MTRP CSI report includes the multiple CSIs, a correspondence between the multiple CSIs and the multiple TRPs is implemented by transmitting the MTRP CSI report to the multiple TRPs, that is, feedback of the multiple CSIs in the MTRP CSI report can be well implemented. In this way, a problem in the prior art that efficiency of CSI reporting is low because each CSI reporting setting corresponds to reporting to one TRP is resolved, and efficiency of CSI reporting is improved.

Optionally, in a case that the uplink channel is a physical uplink shared channel PUSCH, the transmission module 32 in this embodiment of this application may include at least one of the following:

a first reporting unit, configured to have all or part of the CSIs in the MTRP CSI report carried on multiple PUSCH repetition resources respectively, and report the all or part of the CSIs to the multiple TRPs, where each PUSCH repetition resource is configured with a different first parameter, and one PUSCH repetition resource corresponds to one first parameter; and a second reporting unit, configured to have all or part of the CSIs in the MTRP CSI report carried on multiple PUSCH resources respectively, and report the all or part of the CSIs to the multiple TRPs, where one piece of downlink control information triggers multiple PUSCH resources, and each PUSCH resource corresponds to one second parameter.

Optionally, in a case that the uplink channel is a physical uplink control channel PUCCH, the transmission module 32 in this embodiment of this application may include at least one of the following:

a third reporting unit, configured to have all or part of the CSIs in the MTRP CSI report carried on multiple PUCCH repetition resources respectively, and report the all or part of the CSIs to the multiple TRPs, where each PUCCH repetition resource is configured with a different first parameter, and one PUCCH repetition resource corresponds to one first parameter; and a fourth reporting unit, configured to have all or part of the CSIs in the MTRP CSI report carried on multiple PUCCH resources respectively, and report the all or part of the CSIs to the multiple TRPs, where one CSI report setting is associated with multiple PUCCH resources, and each PUCCH resource corresponds to one second parameter.

The first parameter or the second parameter includes at least one of the following: a spatial relation, power control, first information, second information, and a radio resource control RRC configuration parameter. Further, the first information includes at least one of the following information indicated by a DCI field in the DCI: a sounding reference signal resource indicator SRI, a precoding matrix indicator TPMI, and a modulation and coding scheme MCS; and the second information includes information indicated by the DCI field in the DCI except the first information.

Optionally, the CSI is mapped onto different repetition resources, where the repetition resources include at least one of the following: PUSCH repetition resources and PUCCH repetition resources.

Optionally, in a case that the first repetition resource and the second repetition resource are different repetition resources, (1) content on the first repetition resource includes at least one of the following: uplink control information UCI corresponding to a first TRP and common part content; and content on the second repetition resource includes at least one of the following: UCI corresponding to a second TRP and common part content; or (2) content on the first repetition resource includes at least one of the following: UCI corresponding to a first TRP, UCI corresponding to a second TRP, and common part content; and content on the second repetition resource includes at least one of the following: UCI corresponding to the first TRP, UCI corresponding to the second TRP, and common part content, where the common part content is a reporting parameter shared by the first TRP and the second TRP; and the reporting parameter includes at least one of the following: channel state information reference signal resource indicator CRI, PMI, rank indicator RI, channel quality indicator CQI, reference signal received power RSRP, composite codebook index i1, synchronization signal block resource indicator SSBRI, signal to interference plus noise ratio SINR, and layer indicator LI.

Figure 4:
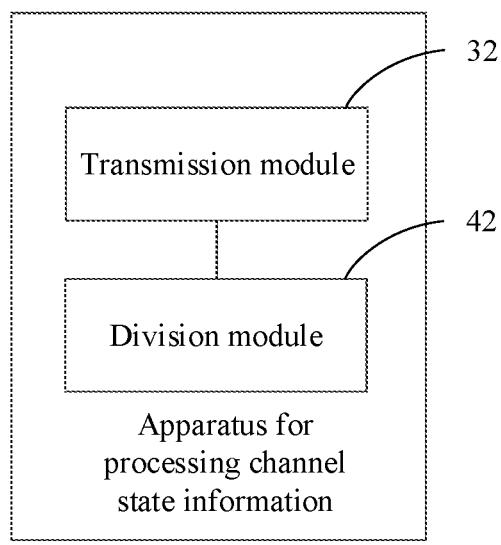
FIG. 4 is a second schematic diagram of a structure of an apparatus for processing channel state information according to an embodiment of this application.

As shown in FIG. 4, in addition to the module in FIG. 3, the apparatus in this embodiment of this application may further include:

a division module 42, configured to divide the MTRP CSI report before the MTRP CSI report is transmitted based on the uplink channel to the multiple TRPs, where each type of parameter in the divided MTRP CSI report corresponds to one or more TRPs.

Optionally, in a case that the divided MTRP CSI report is transmitted based on PUSCH, if part 1 and part 2 of the CSI are both extended, that each type of parameter corresponds to one or more TRPs includes at least one of the following:

(1) For feedback of CSI whose precoding codebook type is type 1, one or more third parameters in the part 1 correspond to one or more TRPs, and one or more fourth parameters in the part 2 correspond to one or more TRPs, where the third parameter includes at least one of the following: rank indicator RI, CRI, and CQI for a first codeword, and the fourth parameter includes at least one of the following: PMI and CQI for a second codeword.

(2) For feedback of CSI whose precoding codebook type is type 2, one or more fifth parameters in the part 1 correspond to one or more TRPs, and one or more sixth parameters in the part 2 correspond to one or more TRPs, where the fifth parameter includes at least one of the following: RI, CRI, CQI, and indicator of the number of non-zero wideband amplitude coefficients per layer for the type 2 CSI, and the sixth parameter includes a parameter for constructing PMI of type 2.

(3) For feedback of CSI whose precoding codebook type is enhanced type 2, one or more seventh parameters in the part 1 correspond to one or more TRPs, and one or more eighth parameters in the part 2 correspond to one or more TRPs, where the seventh parameter includes at least one of the following: RI, CRI, CQI, and indicator of the total number of cross-layer non-zero amplitude coefficients for the enhanced type 2 CSI, and the eighth parameter includes PMI of the enhanced type 2 CSI.

Optionally, in a case that the divided MTRP CSI report is transmitted based on PUSCH, if only part 2 of the CSI is extended, that each type of parameter corresponds to one or more TRPs includes at least one of the following:

(1) For feedback of CSI whose precoding codebook type is type 1, one or more ninth parameters in the part 2 correspond to one or more TRPs, where the ninth parameter includes at least one of the following: RI, CRI, CQI for a first codeword, PMI, and CQI for a second codeword.

(2) For feedback of CSI whose precoding codebook type is type 2, one or more tenth parameters in the part 2 correspond to one or more TRPs, where the tenth parameter includes at least one of the following: RI, CRI, CQI, indicator of the number of non-zero wideband amplitude coefficients per layer for the type 2 CSI, and PMI of the type 2 CSI; and (3) For feedback of CSI whose precoding codebook type is enhanced type 2, one or more eleventh parameters in the part 2 correspond to one or more TRPs, where the eleventh parameter includes at least one of the following: RI, CRI, CQI, indicator of the number of non-zero wideband amplitude coefficients per layer for the enhanced type 2 CSI, and PMI of the enhanced type 2 CSI.

Optionally, in a case that the divided MTRP CSI report is transmitted based on PUCCH, if part 1 and part 2 of the CSI are both extended, that each type of parameter corresponds to one or more TRPs includes at least one of the following:

(1) For feedback of CSI whose precoding codebook type is type 1, one or more twelfth parameters in the part 1 correspond to one or more TRPs, and one or more thirteenth parameters in the part 2 correspond to one or more TRPs, where the twelfth parameter includes at least one of the following: RI, CRI, and CQI for a first codeword, and the thirteenth parameter includes at least one of the following: PMI and CQI for a second codeword.

(2) For feedback of CSI whose precoding codebook type is type 2, one or more fourteenth parameters in the part 1 correspond to one or more TRPs, where the fourteenth parameter includes at least one of the following: RI, CRI, CQI, and indicator of the number of non-zero wideband amplitude coefficients per layer for the type 2 CSI.

Optionally, in a case that the divided MTRP CSI report is transmitted based on PUCCH, if only part 2 of the CSI is extended, that each type of parameter corresponds to one or more TRPs includes at least one of the following:

(1) For feedback of CSI whose precoding codebook type is type 1, one or more fifteenth parameters in the part 2 correspond to one or more TRPs, where the fifteenth parameter includes at least one of the following: RI, CRI, CQI for a first codeword, PMI, and CQI for a second codeword.

(2) For feedback of CSI whose precoding codebook type is type 2, one or more sixteenth parameters in the part 2 correspond to one or more TRPs, where the sixteenth parameter includes at least one of the following: RI, CRI, CQI, and indicator of the number of non-zero wideband amplitude coefficients per layer for the type 2 CSI.

Figure 5:
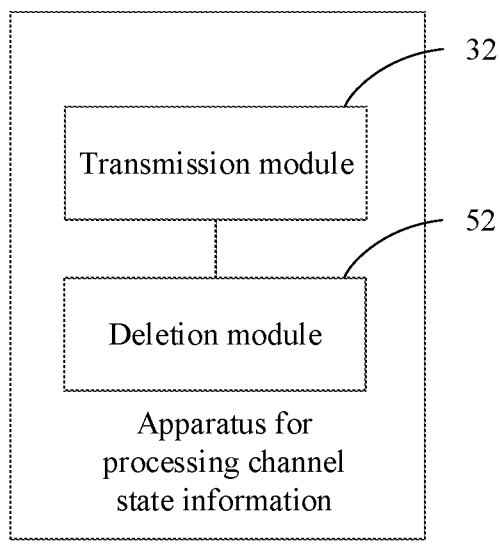
FIG. 5 is a third schematic diagram of a structure of an apparatus for processing channel state information according to an embodiment of this application.

As shown in FIG. 5, in addition to the module in FIG. 3, the apparatus in this embodiment of this application may further include:

a deletion module 52, configured to delete part 2 of CSI according to ascending order of priorities of CSI reports before the MTRP CSI report is transmitted based on the uplink channel to the TRPs.

Optionally, in a case that the divided MTRP CSI report is transmitted based on PUSCH, (1) for feedback of CSI whose precoding codebook type is type 1, the priorities include first priorities, where a descending order of the first priorities is: Part 2 wideband CSI corresponding to one or more TRPs for all CSI reports, Part 2 subband CSI of even subbands corresponding to one or more TRPs for a first CSI report, Part 2 subband CSI of odd subbands corresponding to one or more TRPs for the first CSI report, Part 2 subband CSI of even subbands corresponding to one or more TRPs for a second CSI report, Part 2 subband CSI of odd subbands corresponding to one or more TRPs for the second CSI report, and so on, until Part 2 subband CSI of odd subbands corresponding to one or more TRPs for an $N^{th}$ CSI report;

(2) for feedback of CSI whose precoding codebook type is type 2, the priorities include second priorities, where a descending order of the second priorities is: Part 2 wideband CSI corresponding to one or more TRPs for all CSI reports, Part 2 subband CSI of even subbands corresponding to one or more TRPs for the first CSI report, Part 2 subband CSI of odd subbands corresponding to one or more TRPs for the first CSI report, Part 2 subband CSI of even subbands corresponding to one or more TRPs for the second CSI report, Part 2 subband CSI of odd subbands corresponding to one or more TRPs for the second CSI report, and so on, until Part 2 subband CSI of odd subbands corresponding to one or more TRPs for the N$^{th}$ CSI report; and (3) for feedback of CSI whose precoding codebook type is enhanced type 2, the priorities include third priorities, where a descending order of the third priorities is: Part 2 group 0 corresponding to one or more TRPs for all CSI reports, Part 2 group 1 corresponding to one or more TRPs for the first CSI report, Part 2 group 2 corresponding to one or more TRPs for the first CSI report, Part 2 group 1 corresponding to one or more TRPs for the second CSI report, Part 2 group 2 corresponding to one or more TRPs for the second CSI report, and so on, until Part 2 group 2 corresponding to one or more TRPs for the N$^{th}$ CSI report, where the group 0 includes different parameters for constructing PMI, and the parameters for constructing the PMI correspond to one or more TRPs, where all the CSI reports include the first CSI report to the N$^{th}$ CSI report, and N is an integer greater than 1.

Optionally, in a case that the divided MTRP CSI report is transmitted based on PUSCH, (1) for feedback of CSI whose precoding codebook type is type 1, the priorities include fourth priorities, where a descending order of the fourth priorities is: Part 2 one or more RIs, one or more CRIs, and one or more groups of CQIs for a first codeword and corresponding to one or more TRPs for all CSI reports; Part 2 wideband CSI corresponding to one or more TRPs for all CSI reports, Part 2 subband CSI of even subbands corresponding to one or more TRPs for a first CSI report, Part 2 subband CSI of odd subbands corresponding to one ortable more TRPs for the first CSI report, Part 2 subband CSI of even subbands corresponding to one or more TRPs for a second CSI report, Part 2 subband CSI of odd subbands corresponding to one or more TRPs for the second CSI report, and so on, until Part 2 subband CSI of odd subbands corresponding to one or more TRPs for an N$^{th}$ CSI report;

(2) for feedback of CSI whose precoding codebook type is type 2, the priorities include fifth priorities, where a descending order of the fifth priorities is: Part 2 one or more RIs, one or more CRIs, one or more groups of CQIs for a first codeword, and one or more indicators of the number of non-zero wideband amplitude coefficients per layer for type 2 CSI and corresponding to one or more TRPs for all CSI reports; Part 2 wideband CSI corresponding to one or more TRPs for all CSI reports, Part 2 subband CSI of even subbands corresponding to one or more TRPs for the first CSI report, Part 2 subband CSI of odd subbands corresponding to one or more TRPs for the first CSI report, Part 2 subband CSI of even subbands corresponding to one or more TRPs for the second CSI report, Part 2 subband CSI of odd subbands corresponding to one or more TRPs for the second CSI report, and so on, until Part 2 subband CSI of odd subbands corresponding to one or more TRPs for the N$^{th}$ CSI report; and (3) for feedback of CSI whose precoding codebook type is enhanced type 2, the priorities include sixth priorities, where a descending order of the sixth priorities is: Part 2 group 0 corresponding to one or more TRPs for all CSI reports, Part 2 group 1 corresponding to one or more TRPs for all CSI reports, Part 2 group 2 corresponding to one or more TRPs for the first CSI report, Part 2 group 3 corresponding to one or more TRPs for the first CSI report, Part 2 group 2 corresponding to one or more TRPs for the second CSI report, Part 2 group 3 corresponding to one or more TRPs for the second CSI report, and so on, until Part 2 group 3 corresponding to one or more TRPs for the N$^{th}$ CSI report, where all the CSI reports include the first CSI report to the N$^{th}$ CSI report, and N is an integer greater than 1.

Optionally, in a case that the divided MTRP CSI report is transmitted based on PUCCH, (1) for feedback of CSI whose precoding codebook type is type 1, the priorities include seventh priorities, where a descending order of the seventh priorities is: Part 2 wideband CSI corresponding to one or more TRPs for all CSI reports, Part 2 subband CSI of even subbands corresponding to one or more TRPs for a first CSI report, Part 2 subband CSI of odd subbands corresponding to one or more TRPs for the first CSI report, Part 2 subband CSI of even subbands corresponding to one or more TRPs for a second CSI report, Part 2 subband CSI of odd subbands corresponding to one or more TRPs for the second CSI report, and so on, until Part 2 subband CSI of odd subbands corresponding to one or more TRPs for an N$^{th}$ CSI report;

(2) for feedback of CSI whose precoding codebook type is type 1, the priorities include eighth priorities, where a descending order of the eighth priorities is: Part 2 one or more RIs, one or more CRIs, one or more groups of CQIs for a first codeword, and one or more indicators of the number of non-zero wideband amplitude coefficients per layer for type 2 CSI and corresponding to one or more TRPs for all CSI reports; Part 2 wideband CSI corresponding to one or more TRPs for all CSI reports, Part 2 subband CSI of even subbands corresponding to one or more TRPs for the first CSI report, Part 2 subband CSI of odd subbands corresponding to one or more TRPs for the first CSI report, Part 2 subband CSI of even subbands corresponding to one or more TRPs for the second CSI report, Part 2 subband CSI of odd subbands corresponding to one or more TRPs for the second CSI report, and so on, until Part 2 subband CSI of odd subbands corresponding to one or more TRPs for the N$^{th}$ CSI report; and (3) for feedback of CSI whose precoding codebook type is type 2, the priorities include ninth priorities, where a descending order of the ninth priorities is: Part 2 CSI corresponding to the first CSI report, Part 2 CSI corresponding to the second CSI report, and so on, until Part 2 CSI corresponding to the N$^{th}$ CSI report, where all the CSI reports include the first CSI report to the N$^{th}$ CSI report, and N is an integer greater than 1.

It should be noted that the MTRP CSI report is included in the first CSI report to the N$^{th}$ CSI report.

Figure 6:
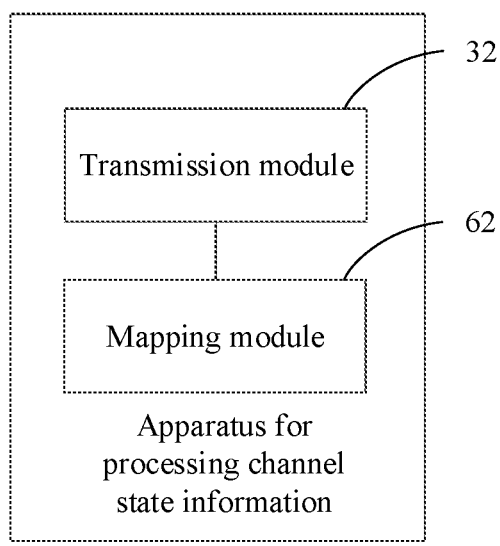
FIG. 6 is a fourth schematic diagram of a structure of an apparatus for processing channel state information according to an embodiment of this application.

As shown in FIG. 6, in addition to the module in FIG. 3, the apparatus in this embodiment of this application may further include:

a mapping module 62, configured to map the CSI in the MTRP CSI report to UCI before the MTRP CSI report is transmitted based on the uplink channel to the TRPs.

Optionally, in a case that the divided MTRP CSI report is transmitted based on PUSCH, if part 1 and part 2 of the CSI are both extended, the mapped CSI in the MTRP CSI report has at least one of the following features:

(1) Each CSI field of each CSI includes one or more CSI elements, where the one or more CSI elements correspond to one or more TRPs.

(2) All CSI fields in part 1 or part 2 of each CSI are divided into multiple groups, the CSI fields in the CSI are mapped by group, and each group after the mapping includes part of CSI elements in one TRP, where the CSI element includes at least one of the following: CRI, RI, LI, wideband CQI for a first codeword, wideband CQI for a second codeword, subband CQI, indicator of the number of non-zero wideband amplitude coefficients at layer 0, indicator of the number of non-zero wideband amplitude coefficients at layer 1, indicator of a total number of non-zero coefficients at all layers, SINR, SINR difference, PMI wideband information, 2-antenna-port codebook index, even subband CQI for a second codeword, PMI even subband information, even subband 2-antenna-port codebook index, odd subband CQI for a second codeword, PMI odd subband information, and odd subband 2-antenna-port codebook index.

Optionally, in a case that the divided MTRP CSI report is transmitted based on PUSCH, if only part 2 of the CSI is extended, the mapped CSI report in the MTRP CSI report has at least one of the following features:

(1) Each CSI field in part 2 of each CSI includes one or more CSI elements, where the CSI element corresponds to one or more TRPs, and the CSI element includes at least one of the following: CRI, RI, LI, wideband CQI for a first codeword, wideband CQI for a second codeword, subband CQI, indicator of the number of non-zero wideband amplitude coefficients at layer 0, indicator of the number of non-zero wideband amplitude coefficients at layer 1, indicator of a total number of non-zero coefficients at all layers, SINR, SINR difference, PMI wideband information, 2-antenna-port codebook index, even subband CQI for a second codeword, PMI even subband information, even subband 2-antenna-port codebook index, odd subband CQI for a second codeword, PMI odd subband information, and odd subband 2-antenna-port codebook index.

(2) All CSI fields in part 2 of each CSI are divided into multiple groups, where part of the multiple groups are special groups, each special group corresponds to part of CSI elements in one TRP, and the CSI element includes at least one of the following: CRI, RI, wideband CQI for a first codeword, subband CQI, indicator of the number of non-zero wideband amplitude coefficients at layer 0, indicator of the number of non-zero wideband amplitude coefficients at layer 1, PMI, and indicator of a total number of non-zero coefficients at all layers; and CSI fields in other groups than the special groups in the multiple groups are mapped by group, and each group after the mapping includes part of CSI elements in one TRP, where the CSI element includes at least one of the following: LI, PMI wideband information, 2-antenna-port codebook index, even subband CQI for a second codeword, PMI even subband information, even subband 2-antenna-port codebook index, odd subband CQI for a second codeword, PMI odd subband information, and odd subband 2-antenna-port codebook index.

Optionally, in a case that the divided MTRP CSI report is transmitted based on PUCCH, if part 1 and part 2 of the CSI are both extended, the mapped CSI in the MTRP CSI report has at least one of the following features:

(1) Each CSI field includes one or more CSI elements, where the CSI element corresponds to one or more TRPs.

(2) All CSI fields in part 1 or part 2 of each CSI are divided into multiple groups, the CSI fields in the CSI are mapped by group, and each group after the mapping includes part of CSI elements in one TRP, where the CSI element includes at least one of the following: CRI, RI, LI, wideband CQI for a first codeword, wideband CQI for a second codeword, subband CQI, indicator of the number of non-zero wideband amplitude coefficients at layer 0, indicator of the number of non-zero wideband amplitude coefficients at layer 1, PMI, PMI wideband information, and 2-antenna-port codebook index.

Optionally, in a case that the divided MTRP CSI report is transmitted based on PUCCH, if only part 2 of the CSI is extended, the mapped CSI report in the MTRP CSI report has at least one of the following features:

(1) Each CSI field in part 2 of each CSI includes one or more CSI elements, where the CSI element corresponds to one or more TRPs, and the CSI element includes at least one of the following: CRI, RI, LI, wideband CQI for a first codeword, wideband CQI for a second codeword, subband CQI, indicator of the number of non-zero wideband amplitude coefficients at layer 0, indicator of the number of non-zero wideband amplitude coefficients at layer 1, PMI, PMI wideband information, and 2-antenna-port codebook index.

(2) All CSI fields in part 2 of each CSI report are divided into multiple groups, where the multiple groups include special groups, each special group corresponds to part of CSI elements in one TRP, and the CSI element includes at least one of the following: CRI, RI, wideband CQI for a first codeword, subband CQI, indicator of the number of non-zero wideband amplitude coefficients at layer 0, indicator of the number of non-zero wideband amplitude coefficients at layer 1, and PMI; and CSI fields in other groups of CSI than the special groups in the multiple groups are mapped by group, and each group after the mapping includes part of CSI elements in one TRP, where the CSI element includes at least one of the following: LI, PMI wideband information, and 2-antenna-port codebook index.

The apparatus for processing channel state information in this embodiment of this application may be a terminal, or may be a component, an integrated circuit, or a chip in a terminal. The apparatus may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this application.

The apparatus for processing channel state information in this embodiment of this application may be an apparatus having an operating system. The operating system may be an Android operating system, an iOS operating system, or other possible operating systems, and is not specifically limited in this embodiment of this application.

The apparatus for processing channel state information according to this embodiment of this application can implement each process implemented by the method embodiment in FIG. 2, with the same technical effect achieved. To avoid repetition, details are not described herein again.

Figure 7:
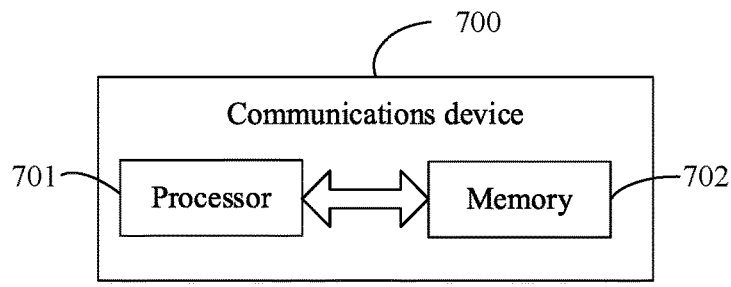
FIG. 7 is a schematic diagram of a structure of a communications device according to an embodiment of this application.

Optionally, as shown in FIG. 7, an embodiment of this application further provides a communications device 700, including a processor 701, a memory 702, and a program or instructions stored in the memory 702 and capable of running on the processor 701. For example, when the communications device 700 is a terminal, and the program or instructions are executed by the processor 701, each process of the foregoing embodiment of the method for processing channel state information is implemented, with the same technical effect achieved. When the communications device 700 is a network-side device, and the program or instructions are executed by the processor 701, each process of the foregoing embodiment of the method for processing channel state information is implemented, with the same technical effect achieved. To avoid repetition, details are not described herein again.

Figure 8:
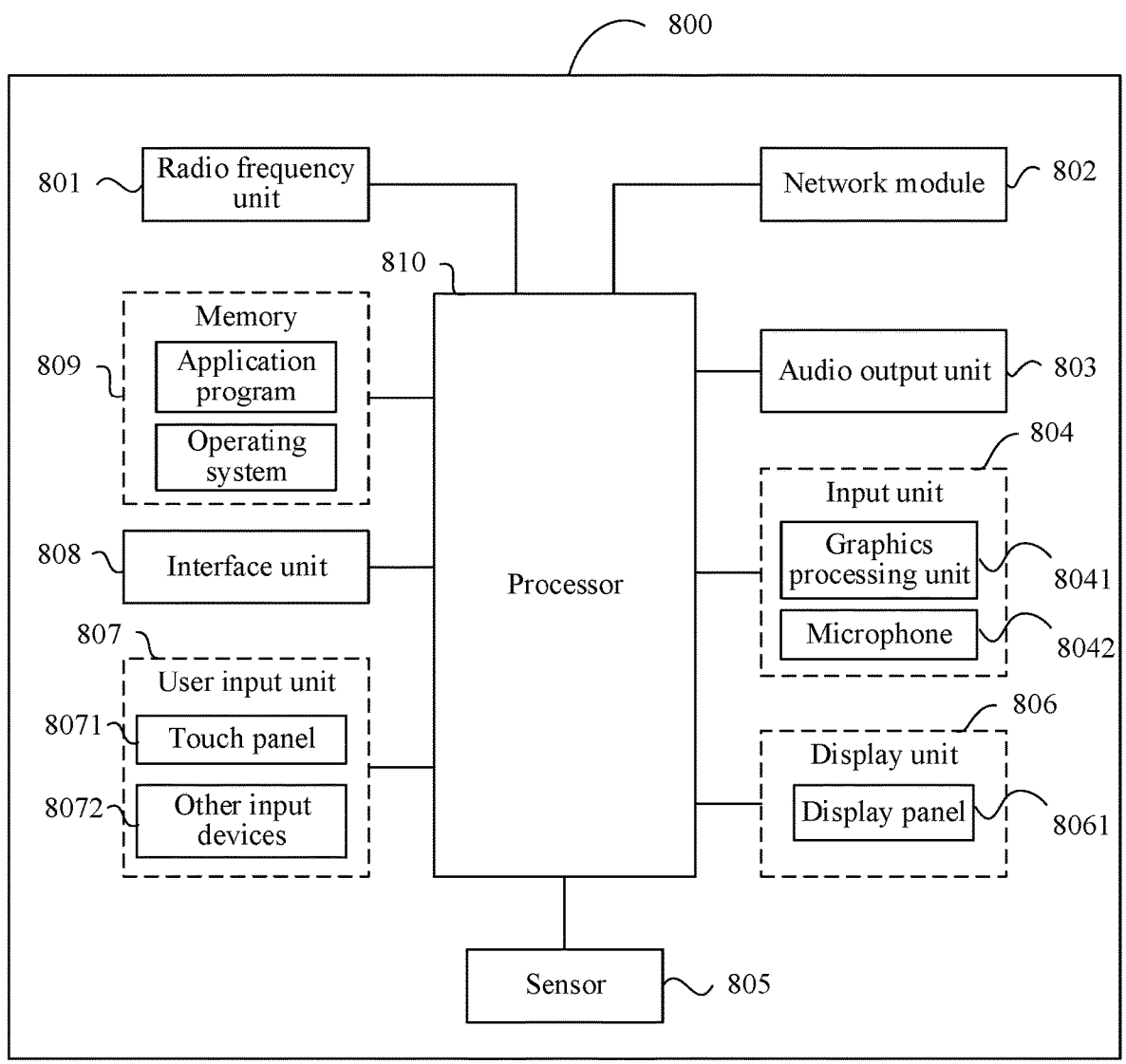
FIG. 8 is a schematic diagram of a structure of a terminal according to an embodiment of this application.

FIG. 8 is a schematic diagram of a hardware structure of a terminal for implementing an embodiment of this application.

The terminal 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

A person skilled in the art may understand that the terminal 800 may further include a power supply (for example, a battery) supplying power to all components. The power supply may be logically connected to the processor 810 through a power management system. In this way, functions such as charge management, discharge management, and power consumption management are implemented by using the power management system. The structure of the terminal shown in FIG. 8 does not constitute a limitation on the terminal. A quantity of components included in the terminal may be greater or less than that shown in FIG. 8, or some components are combined, or component arrangements are different. Details are not described herein.

It should be understood that, in this embodiment of this application, the input unit 804 may include a graphics processing unit (GPU) 8041 and a microphone 8042. The graphics processing unit 8041 processes image data of a still picture or video obtained by an image capture apparatus (such as a camera) in a video capture mode or an image capture mode. The display unit 806 may include a display panel 8061, and the display panel 8061 may be configured in a form of a liquid crystal display, an organic light-emitting diode, or the like. The user input unit 807 includes a touch panel 8071 and other input devices 8072. The touch panel 8071 is also referred to as a touchscreen. The touch panel 8071 may include two parts: a touch detection apparatus and a touch controller. The other input devices 8072 may include but are not limited to a physical keyboard, a function key (such as a volume control key or a switch key), a trackball, a mouse, and a joystick. Details are not described herein again.

In this embodiment of this application, after receiving downlink data from a network-side device, the radio frequency unit 801 sends the downlink data to the processor 810 for processing, and in addition, sends uplink data to the network-side device. Generally, the radio frequency unit 801 includes but is not limited to an antenna, at least one amplifier, a transceiver, a coupler, a low noise amplifier, a duplexer, and the like.

The memory 809 may be configured to store software programs or instructions and various data. The memory 809 may primarily include a program or instruction storage area and a data storage area. The program or instruction storage area may store an operating system, an application program or instructions (such as an audio play function and an image play function) required by at least one function, and the like.

In addition, the memory 809 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 810 may include one or more processing units. Optionally, the processor 810 may integrate an application processor and a modem processor. The application processor mainly processes the operating system, a user interface, an application program, or an instruction. The modem processor mainly processes wireless communication. For example, the modem processor is a baseband processor. It may be understood that the modem processor may alternatively not be integrated in the processor 810.

The radio frequency unit 801 is configured to transmit, based on uplink channel, a multi transmission-reception point channel state information MTRP CSI report to multiple transmission-reception points TRPs, where the MTRP CSI report includes multiple CSIs.

In this embodiment of this application, because the MTRP CSI report includes the multiple CSIs, a correspondence between the multiple CSIs and the multiple TRPs is implemented by transmitting the MTRP CSI report to the multiple TRPs, that is, feedback of the multiple CSIs in the MTRP CSI report can be well implemented. In this way, a problem in the prior art that efficiency of CSI reporting is low because each CSI reporting setting corresponds to reporting to one TRP is resolved, and efficiency of CSI reporting is improved.

An embodiment of this application further provides a readable storage medium. The readable storage medium stores a program or instructions. When the program or instructions are executed by a processor, each process of the foregoing embodiment of the method for processing channel state information is implemented, with the same technical effect achieved. To avoid repetition, details are not described herein again.

The processor is a processor in the terminal in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions on a network-side device to implement each process of the foregoing embodiment of the method for processing channel state information, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . ." does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for enabling a terminal (which may be a mobile phone, a computer, a server, an air conditioner, a network device, or the like) to perform the methods described in the embodiments of this application.

A person of ordinary skill in the art may be easily aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiments are merely examples. For example, the division of units is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communications connections through some interfaces, apparatuses or units, and may be implemented in electrical, mechanical, or other forms.

The units described as separate parts may or may not be physically separate and parts displayed as units may or may not be physical units, meaning that they may be located in one position or distributed on a plurality of network elements. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as a separate product, the functions may be stored in a computer-readable storage medium. Based on such an understanding, the technical solutions of the present disclosure substantially or parts contributing to the prior art or parts of the technical solutions may be embodied in a form of a software product, and the computer software product is stored in a storage medium, including several instructions for enabling a computer device (which may be a personal computer, a server, a network device, or the like) to perform all or part of the steps of the method in each embodiment of the present disclosure. The foregoing storage medium includes: any medium that can store program code, such as a USB flash drive, a removable hard disk, a ROM, a RAM, a magnetic disk, or an optical disc.

A person of ordinary skill in the art may understand that all or part of the processes of the foregoing method embodiments may be implemented by related hardware controlled by a computer program. The program may be stored in a computer-readable storage medium. When the program is executed, the processes of the foregoing method embodiments may be performed. The storage medium may include a magnetic disk, an optical disc, a read-only memory (ROM), a random access memory (RAM), or the like.

The embodiments of this application are described above with reference to the accompanying drawings. However, this application is not limited to the foregoing specific embodiments. The foregoing specific embodiments are merely illustrative rather than restrictive. Inspired by this application, a person of ordinary skill in the art can still derive a plurality of variations without departing from the essence of this application and the protection scope of the claims. All these variations shall fall within the protection scope of this application.

What is claimed is:

1. A method for processing channel state information, performed by a terminal and comprising:
    transmitting, based on uplink channel, a multi transmission-reception point channel state information (MTRP CSI) report to multiple transmission-reception points (TRPs), wherein
    the MTRP CSI report comprises multiple CSI parameters, wherein before the transmitting, based on uplink channel, an MTRP CSI report to multiple TRPs, the method further comprises: dividing the MTRP CSI report to part 1 and part 2, wherein each type of parameter in the divided MTRP CSI report corresponds to one or more TRPs.

2. The method according to claim 1, wherein in a case that the uplink channel is a physical uplink shared channel (PUSCH), the transmitting, based on uplink channel, an MTRP CSI report to multiple TRPs comprises at least one of the following:
    having all or part of the CSI parameters in the MTRP CSI report carried on multiple PUSCH repetition resources respectively, and reporting the all or part of the CSI parameters to the multiple TRPs, wherein each PUSCH repetition resource is configured with a different first parameter, and one PUSCH repetition resource corresponds to one first parameter; and having all or part of the CSI parameters in the MTRP CSI report on multiple PUSCH resources respectively, and reporting the all or part of the CSI parameters to the multiple TRPs, wherein one piece of downlink control information triggers multiple PUSCH resources, and each PUSCH resource corresponds to one second parameter.

3. The method according to claim 1, wherein in a case that the uplink channel is a physical uplink control channel (PUCCH), the transmitting, based on uplink channel, an MTRP CSI report to multiple TRPs comprises at least one of the following:

having all or part of the CSI parameters in the MTRP CSI report carried on multiple PUCCH repetition resources respectively, and reporting the all or part of the CSI parameters to the multiple TRPs, wherein each PUCCH repetition resource is configured with a different first parameter, and one PUCCH repetition resource corresponds to one first parameter; and having all or part of the CSI parameters in the MTRP CSI report carried on multiple PUCCH resources respectively, and reporting the all or part of the CSI parameters to the multiple TRPs, wherein one CSI reporting setting is associated with multiple PUCCH resources, and each PUCCH resource corresponds to one second parameter.

4. The method according to claim 2, wherein the first parameter or the second parameter comprises at least one of the following:

spatial relation, power control, first information, second information, and radio resource control RRC configuration parameter, wherein the first information comprises at least one of the following information indicated by a DCI field in the DCI: sounding reference signal resource indicator (SRI), precoding matrix indicator (TPMI), and modulation and coding scheme (MCS); and the second information comprises information indicated by the DCI field in the DCI except the first information.

5. The method according to claim 2, wherein the CSI is mapped onto different repetition resources, wherein the repetition resources comprise at least one of the following: PUSCH repetition resources and PUCCH repetition resources.

6. The method according to claim 5, wherein in a case that the first repetition resource and the second repetition resource are different repetition resources, content on the first repetition resource comprises at least one of the following: uplink control information (UCI) corresponding to a first TRP and common part content; and content on the second repetition resource comprises at least one of the following: UCI corresponding to a second TRP and common part content; or content on the first repetition resource comprises at least one of the following: UCI corresponding to a first TRP, UCI corresponding to a second TRP, and common part content; and content on the second repetition resource comprises at least one of the following: UCI corresponding to the first TRP, UCI corresponding to the second TRP, and common part content, wherein the common part content is a reporting parameter shared by the first TRP and the second TRP; and the reporting parameter comprises at least one of the following: channel state information reference signal resource indicator CRI, PMI, rank indicator (RI), channel quality indicator (CQI), reference signal received power (RSRP), composite codebook index i1, synchronization signal block resource indicator (SSBRI), signal to interference plus noise ratio (SINR), and layer indicator (LI).

7. The method according to claim 1, wherein in a case that the divided MTRP CSI report is transmitted based on PUSCH, if part 1 and part 2 of the MTRP CSI report are both extended, that each type of parameter corresponds to one or more TRPs comprises at least one of the following:

for feedback of CSI whose precoding codebook type is type 1, one third parameter in the part 1 corresponds to multiple TRPs, or one third parameter in the part 1 corresponds to multiple TRPs and another third parameter in the part 1 corresponds to one TRP, or one third parameter in the part 1 corresponds to multiple TRPs and multiple third parameters in the part 1 correspond to multiple TRPs; and one fourth parameter in the part 2 corresponds to multiple TRPs, or multiple fourth parameters in the part 2 correspond to multiple TRPs, wherein the third parameter comprises at least one of the following: rank indicator (RI), CRI, and CQI for a first codeword, and the fourth parameter comprises at least one of the following: PMI and CQI for a second codeword;

for feedback of CSI whose precoding codebook type is type 2, one fifth parameter in the part 1 corresponds to multiple TRPs, or one fifth parameters in the part 1 corresponds to multiple TRPs and another fifth parameter in the part 1 corresponds to one TRP, or one fifth parameter in the part 1 corresponds to multiple TRPs and multiple fifth parameters in the part 1 correspond to multiple TRPs; and one sixth parameter in the part 2 corresponds to multiple TRPs, or multiple sixth parameters in the part 2 correspond to multiple TRPs, wherein the fifth parameter comprises at least one of the following: RI, CRI, CQI, and indicator of the number of non-zero wideband amplitude coefficients per layer for the type 2 CSI, and the sixth parameter comprises a parameter for constructing PMI of type 2; and for feedback of CSI whose precoding codebook type is enhanced type 2, one seventh parameter in the part 1 corresponds to multiple TRPs, or one seventh parameter in the part 1 corresponds to multiple TRPs and another seventh parameter in the part 1 corresponds to one TRP, or one seventh parameter in the part 1 corresponds to multiple TRPs and multiple seventh parameters in the part 1 correspond to multiple TRPs; and one eighth parameter in the part 2 corresponds to multiple TRPs, or multiple eighth parameters in the part 2 correspond to multiple TRPs, wherein the seventh parameter comprises at least one of the following: RI, CRI, CQI, and indicator of the total number of cross-layer non-zero amplitude coefficients for the enhanced type 2 CSI, and the eighth parameter comprises PMI of the enhanced type 2 CSI.

8. The method according to claim 1, wherein in a case that the divided MTRP CSI report is transmitted based on PUSCH, if only part 2 of the CSI is extended, that each type of parameter corresponds to one or more TRPs comprises at least one of the following:

for feedback of CSI whose precoding codebook type is type 1, one or more ninth parameters in the part 2 correspond to one or more TRPs, wherein the ninth parameter comprises at least one of the following: RI, CRI, CQI for a first codeword, PMI, and CQI for a second codeword;

for feedback of CSI whose precoding codebook type is type 2, one or more tenth parameters in the part 2 correspond to one or more TRPs, wherein the tenth parameter comprises at least one of the following: RI, CRI, CQI, indicator of the number of non-zero wideband amplitude coefficients per layer for the type 2 CSI, and PMI of the type 2 CSI; and for feedback of CSI whose precoding codebook type is enhanced type 2, one or more eleventh parameters in the part 2 correspond to one or more TRPs, wherein the eleventh parameter comprises at least one of the following: RI, CRI, CQI, indicator of the number of non-zero wideband amplitude coefficients per layer for the enhanced type 2 CSI, and PMI of the enhanced type 2 CSI.

9. The method according to claim 1, wherein in a case that the divided MTRP CSI report is transmitted based on PUCCH, if part 1 and part 2 of the CSI are both extended, that each type of parameter corresponds to one or more TRPs comprises at least one of the following:

for feedback of CSI whose precoding codebook type is type 1, one twelfth parameter in the part 1 corresponds to multiple TRPs, or one twelfth parameters in the part 1 corresponds to multiple TRPs and another twelfth parameter in the part 1 corresponds to one TRP, or one twelfth parameter in the part 1 corresponds to multiple TRPs and multiple twelfth parameters in the part 1 correspond to multiple TRPs; and one thirteenth parameter in the part 2 corresponds to multiple TRPs, or multiple thirteenth parameters in the part 2 correspond to multiple TRPs, wherein the twelfth parameter comprises at least one of the following: RI, CRI, and CQI for a first codeword, and the thirteenth parameter comprises at least one of the following: PMI and CQI for a second codeword; and for feedback of CSI whose precoding codebook type is type 2, one fourteenth parameter in the part 1 corresponds to multiple TRPs, or one fourteenth parameter in the part 1 corresponds to multiple TRPs and another fourteenth parameter in the part 1 corresponds to one TRP, or one fourteenth parameter in the part 1 corresponds to multiple TRPs and multiple fourteenth parameters in the part 1 correspond to multiple TRPs, wherein the fourteenth parameter comprises at least one of the following: RI, CRI, CQI, and indicator of the number of non-zero wideband amplitude coefficients per layer for the type 2 CSI.

10. The method according to claim 1, wherein in a case that the divided MTRP CSI report is transmitted based on PUCCH, if only part 2 of the CSI is extended, that each type of parameter corresponds to one or more TRPs comprises at least one of the following:

for feedback of CSI whose precoding codebook type is type 1, one or more fifteenth parameters in the part 2 correspond to one or more TRPs, wherein the fifteenth parameter comprises at least one of the following: RI, CRI, CQI for a first codeword, PMI, and CQI for a second codeword; and for feedback of CSI whose precoding codebook type is type 2, one or more sixteenth parameters in the part 2 correspond to one or more TRPs, wherein the sixteenth parameter comprises at least one of the following: RI, CRI, CQI, and indicator of the number of non-zero wideband amplitude coefficients per layer for the type 2 CSI.

11. The method according to claim 1, wherein before the transmitting, based on uplink channel, an MTRP CSI report to TRPs, the method further comprises:

deleting part 2 of CSI according to ascending order of priorities of CSI reports.

12. The method according to claim 11, wherein in a case that the divided MTRP CSI report is transmitted based on PUSCH, for feedback of CSI whose precoding codebook type is type 1, the priorities comprise first priorities, wherein a descending order of the first priorities is: Part 2 wideband CSI corresponding to one or more TRPs for all CSI reports, Part 2 subband CSI of even subbands corresponding to one or more TRPs for a first CSI report, Part 2 subband CSI of odd subbands corresponding to one or more TRPs for the first CSI report, Part 2 subband CSI of even subbands corresponding to one or more TRPs for a second CSI report, Part 2 subband CSI of odd subbands corresponding to one or more TRPs for the second CSI report, and so on, until Part 2 subband CSI of odd subbands corresponding to one or more TRPs for an $N^{th}$ CSI report;

for feedback of CSI whose precoding codebook type is type 2, the priorities comprise second priorities, wherein a descending order of the second priorities is: Part 2 wideband CSI corresponding to one or more TRPs for all CSI reports, Part 2 subband CSI of even subbands corresponding to one or more TRPs for the first CSI report, Part 2 subband CSI of odd subbands corresponding to one or more TRPs for the first CSI report, Part 2 subband CSI of even subbands corresponding to one or more TRPs for the second CSI report, Part 2 subband CSI of odd subbands corresponding to one or more TRPs for the second CSI report, and so on, until Part 2 subband CSI of odd subbands corresponding to one or more TRPs for the $N^{th}$ CSI report; and for feedback of CSI whose precoding codebook type is enhanced type 2, the priorities comprise third priorities, wherein a descending order of the third priorities is: Part 2 group 0 corresponding to one or more TRPs for all CSI reports, Part 2 group 1 corresponding to one or more TRPs for the first CSI report, Part 2 group 2 corresponding to one or more TRPs for the first CSI report, Part 2 group 1 corresponding to one or more TRPs for the second CSI report, Part 2 group 2 corresponding to one or more TRPs for the second CSI report, and so on, until Part 2 group 2 corresponding to one or more TRPs for the $N^{th}$ CSI report, wherein the group 0 comprises different parameters for constructing PMI, and the parameters for constructing the PMI correspond to one or more TRPs, wherein all the CSI reports comprise the first CSI report to the $N^{th}$ CSI report, and N is an integer greater than 1.

13. The method according to claim 11, wherein in a case that the divided MTRP CSI report is transmitted based on PUSCH, for feedback of CSI whose precoding codebook type is type 1, the priorities comprise fourth priorities, wherein a descending order of the fourth priorities is: Part 2 one or more RIs, one or more CRIs, and one or more groups of CQIs for a first codeword and corresponding to one or more TRPs for all CSI reports; Part 2 wideband CSI corresponding to one or more TRPs for all CSI reports, Part 2 subband CSI of even subbands corresponding to one or more TRPs for a first CSI report, Part 2 subband CSI of odd subbands corresponding to one or more TRPs for the first CSI report, Part 2 subband CSI of even subbands corresponding to one or more TRPs for a second CSI report, Part 2 subband CSI of odd subbands corresponding to one or more TRPs for the second CSI report, and so on, until Part 2 subband CSI of odd subbands corresponding to one or more TRPs for an $N^{th}$ CSI report;

for feedback of CSI whose precoding codebook type is type 2, the priorities comprise fifth priorities, wherein a descending order of the fifth priorities is: Part 2 one or more RIs, one or more CRIs, one or more groups of CQIs for a first codeword, and one or more indicators of the number of non-zero wideband amplitude coefficients per layer for type 2 CSI and corresponding to one or more TRPs for all CSI reports; Part 2 wideband CSI corresponding to one or more TRPs for all CSI reports, Part 2 subband CSI of even subbands corresponding to one or more TRPs for the first CSI report, Part 2 subband CSI of odd subbands corresponding to one or more TRPs for the first CSI report, Part 2 subband CSI of even subbands corresponding to one or more TRPs for the second CSI report, Part 2 subband CSI of odd subbands corresponding to one or more TRPs for the second CSI report, and so on, until Part 2 subband CSI of odd subbands corresponding to one or more TRPs for the $N^{th}$ CSI report; and for feedback of CSI whose precoding codebook type is enhanced type 2, the priorities comprise sixth priorities, wherein a descending order of the sixth priorities is: Part 2 group 0 corresponding to one or more TRPs for all CSI reports, Part 2 group 1 corresponding to one or more TRPs for all CSI reports, Part 2 group 2 corresponding to one or more TRPs for the first CSI report, Part 2 group 3 corresponding to one or more TRPs for the first CSI report, Part 2 group 2 corresponding to one or more TRPs for the second CSI report, Part 2 group 3 corresponding to one or more TRPs for the second CSI report, and so on, until Part 2 group 3 corresponding to one or more TRPs for the $N^{th}$ CSI report, wherein all the CSI reports comprise the first CSI report to the $N^{th}$ CSI report, and N is an integer greater than 1;

or, wherein in a case that the divided MTRP CSI report is transmitted based on PUCCH, for feedback of CSI whose precoding codebook type is type 1, the priorities comprise seventh priorities, wherein a descending order of the seventh priorities is: Part 2 wideband CSI corresponding to one or more TRPs for all CSI reports, Part 2 subband CSI of even subbands corresponding to one or more TRPs for a first CSI report, Part 2 subband CSI of odd subbands corresponding to one or more TRPs for the first CSI report, Part 2 subband CSI of even subbands corresponding to one or more TRPs for a second CSI report, Part 2 subband CSI of odd subbands corresponding to one or more TRPs for the second CSI report, and so on, until Part 2 subband CSI of odd subbands corresponding to one or more TRPs for an $N^{th}$ CSI report;

for feedback of CSI whose precoding codebook type is type 2, the priorities comprise eighth priorities, wherein a descending order of the eighth priorities is: Part 2 one or more RIs, one or more CRIs, one or more groups of CQIs for a first codeword, and one or more indicators of the number of non-zero wideband amplitude coefficients per layer for type 2 CSI and corresponding to one or more TRPs for all CSI reports; Part 2 wideband CSI corresponding to one or more TRPs for all CSI reports, Part 2 subband CSI of even subbands corresponding to one or more TRPs for the first CSI report, Part 2 subband CSI of odd subbands corresponding to one or more TRPs for the first CSI report, Part 2 subband CSI of even subbands corresponding to one or more TRPs for the second CSI report, Part 2 subband CSI of odd subbands corresponding to one or more TRPs for the second CSI report, and so on, until Part 2 subband CSI of odd subbands corresponding to one or more TRPs for the $N^{th}$ CSI report; and for feedback of CSI whose precoding codebook type is type 2, the priorities comprise ninth priorities, wherein a descending order of the ninth priorities is: Part 2 CSI corresponding to the first CSI report, Part 2 CSI corresponding to the second CSI report, and so on, until Part 2 CSI corresponding to the $N^{th}$ CSI report, wherein all the CSI reports comprise the first CSI report to the $N^{th}$ CSI report, and N is an integer greater than 1.

14. The method according to claim 12, wherein the MTRP CSI report is comprised in the first CSI report to the $N^{th}$ CSI report.

15. The method according to claim 1, wherein before the transmitting, based on uplink channel, an MTRP CSI report to TRPs, the method further comprises:

mapping the CSI in the MTRP CSI report to UCI.

16. The method according to claim 15, wherein in a case that the divided MTRP CSI report is transmitted based on PUSCH, if part 1 and part 2 of the CSI are both extended, the mapped CSI in the MTRP CSI report has at least one of the following features:

each CSI field of each CSI report comprises one or more CSI elements, wherein the one or more CSI elements correspond to one or more TRPs; and all CSI fields in part 1 or part 2 of each CSI report are divided into multiple groups, the CSI fields in the CSI are mapped by group, and each group after the mapping comprises part of CSI elements in one TRP, wherein the CSI element comprises at least one of the following: CRI, RI, LI, wideband CQI for a first codeword, wideband CQI for a second codeword, subband CQI, indicator of the number of non-zero wideband amplitude coefficients at layer 0, indicator of the number of non-zero wideband amplitude coefficients at layer 1, indicator of a total number of non-zero coefficients at all layers, SINR, SINR difference, PMI wideband information, 2-antenna-port codebook index, even subband CQI for a second codeword, PMI even subband information, even subband 2-antenna-port codebook index, odd subband CQI for a second codeword, PMI odd subband information, and odd subband 2-antenna-port codebook index;

or, wherein in a case that the divided MTRP CSI report is transmitted based on PUSCH, if only part 2 of the CSI is extended, the mapped CSI report in the MTRP CSI report has at least one of the following features:

each CSI field in part 2 of each CSI report comprises one or more CSI elements, wherein the CSI element corresponds to one or more TRPs, and the CSI element comprises at least one of the following: CRI, RI, LI, wideband CQI for a first codeword, wideband CQI for a second codeword, subband CQI, indicator of the number of non-zero wideband amplitude coefficients at layer 0, indicator of the number of non-zero wideband amplitude coefficients at layer 1, indicator of a total number of non-zero coefficients at all layers, SINR, SINR difference, PMI wideband information, 2-antenna-port codebook index, even subband CQI for a second codeword, PMI even subband information, even subband 2-antenna-port codebook index, odd subband CQI for a second codeword, PMI odd subband information, and odd subband 2-antenna-port codebook index; and all CSI fields in part 2 of each CSI report are divided into multiple groups, wherein part of the multiple groups are special groups, each special group corresponds to part of CSI elements in one TRP, and the CSI element comprises at least one of the following: CRI, RI, wideband CQI for a first codeword, subband CQI, indicator of the number of non-zero wideband amplitude coefficients at layer 0, indicator of the number of non-zero wideband amplitude coefficients at layer 1, PMI, and indicator of a total number of non-zero coefficients at all layers; and CSI fields in other groups than the special groups in the multiple groups are mapped by group, and each group after the mapping comprises part of CSI elements in one TRP, wherein the CSI element comprises at least one of the following: LI, PMI wideband information, 2-antenna-port codebook index, even subband CQI for a second codeword, PMI even subband information, even subband 2-antenna-port codebook index, odd subband CQI for a second codeword, PMI odd subband information, and odd subband 2-antenna-port codebook index.

17. The method according to claim 15, wherein in a case that the divided MTRP CSI report is transmitted based on PUCCH, if part 1 and part 2 of the CSI are both extended, the mapped CSI in the MTRP CSI report has at least one of the following features:

each CSI field comprises one or more CSI elements, wherein the CSI element corresponds to one or more TRPs; and all CSI fields in part 1 or part 2 of each CSI are divided into multiple groups, the CSI fields in the CSI are mapped by group, and each group after the mapping comprises part of CSI elements in one TRP, wherein the CSI element comprises at least one of the following: CRI, RI, LI, wideband CQI for a first codeword, wideband CQI for a second codeword, subband CQI, indicator of the number of non-zero wideband amplitude coefficients at layer 0, indicator of the number of non-zero wideband amplitude coefficients at layer 1, PMI, PMI wideband information, and 2-antenna-port codebook index;

or, wherein in a case that the divided MTRP CSI report is transmitted based on PUCCH, if only part 2 of the CSI is extended, the mapped CSI report in the MTRP CSI report has at least one of the following features:

each CSI field in part 2 of each CSI report comprises one or more CSI elements, wherein the CSI element corresponds to one or more TRPs, and the CSI element comprises at least one of the following: CRI, RI, LI, wideband CQI for a first codeword, wideband CQI for a second codeword, subband CQI, indicator of the number of non-zero wideband amplitude coefficients at layer 0, indicator of the number of non-zero wideband amplitude coefficients at layer 1, PMI, PMI wideband information, and 2-antenna-port codebook index; and all CSI fields in part 2 of each CSI report report are divided into multiple groups, wherein the multiple groups comprise special groups, each special group corresponds to part of CSI elements in one TRP, and the CSI element comprises at least one of the following: CRI, RI, wideband CQI for a first codeword, subband CQI, indicator of the number of non-zero wideband amplitude coefficients at layer 0, indicator of the number of non-zero wideband amplitude coefficients at layer 1, and PMI; and CSI fields in other groups of CSI than the special groups in the multiple groups are mapped by group, and each group after the mapping comprises part of CSI elements in one TRP, wherein the CSI element comprises at least one of the following: LI, PMI wideband information, and 2-antenna-port codebook index.

18. A terminal, comprising a processor, a memory, and a program or instructions stored in the memory and capable of running on the processor, wherein when the program or instructions are executed by the processor, the processor is configured to:

transmit, based on uplink channel, a multi transmission-reception point channel state information (MTRP CSI) report to multiple transmission-reception points (TRPs), wherein the MTRP CSI report comprises multiple CSI parameters, wherein before the transmitting, based on uplink channel, an MTRP CSI report to multiple TRPs, the method further comprises: dividing the MTRP CSI report to part 1 and part 2, wherein each type of parameter in the divided MTRP CSI report corresponds to one or more TRPs.

19. A non-transitory readable storage medium, wherein the readable storage medium stores a program or instructions, and the program or instructions, when being executed by a processor, causes the processor to transmit, based on uplink channel, a multi transmission-reception point channel state information (MTRP CSI) report to multiple transmission-reception points (TRPs), wherein the MTRP CSI report comprises multiple CSI parameters, wherein before the transmitting, based on uplink channel, an MTRP CSI report to multiple TRPs, the method further comprises: dividing the MTRP CSI report to part 1 and part 2, wherein each type of parameter in the divided MTRP CSI report corresponds to one or more TRPs.

20. The terminal according to claim 18, wherein in a case that the uplink channel is a physical uplink shared channel (PUSCH), the transmitting, based on uplink channel, an MTRP CSI report to multiple TRPs comprises at least one of the following:

having all or part of the CSI parameters in the MTRP CSI report carried on multiple PUSCH repetition resources respectively, and reporting the all or part of the CSI parameters to the multiple TRPs, wherein each PUSCH repetition resource is configured with a different first parameter, and one PUSCH repetition resource corresponds to one first parameter; and having all or part of the CSI parameters in the MTRP CSI report on multiple PUSCH resources respectively, and reporting the all or part of the CSI parameters to the multiple TRPs, wherein one piece of downlink control information triggers multiple PUSCH resources, and each PUSCH resource corresponds to one second parameter.

* * * * *